United States Patent
Sutou et al.

(10) Patent No.: US 11,543,513 B2
(45) Date of Patent: Jan. 3, 2023

(54) INFORMATION PROCESSING APPARATUS, INFORMATION PROCESSING METHOD AND PROGRAM

(71) Applicant: Sony Corporation, Tokyo (JP)

(72) Inventors: Yasuhiro Sutou, Kanagawa (JP); Hideki Oyaizu, Tokyo (JP); Takuto Motoyama, Kanagawa (JP); Toshio Yamazaki, Tokyo (JP)

(73) Assignee: Sony Corporation, Tokyo (JP)

(*) Notice: Subject to any disclaimer, the term of this patent is extended or adjusted under 35 U.S.C. 154(b) by 426 days.

(21) Appl. No.: 15/762,604

(22) PCT Filed: Sep. 16, 2016

(86) PCT No.: PCT/JP2016/077434
§ 371 (c)(1),
(2) Date: Mar. 23, 2018

(87) PCT Pub. No.: WO2017/057061
PCT Pub. Date: Apr. 6, 2017

(65) Prior Publication Data
US 2018/0284257 A1 Oct. 4, 2018

(30) Foreign Application Priority Data
Sep. 30, 2015 (JP) .............................. JP2015-193365

(51) Int. Cl.
*G01S 13/93* (2020.01)
*G01B 11/00* (2006.01)
(Continued)

(52) U.S. Cl.
CPC .............. *G01S 13/86* (2013.01); *G01B 11/00* (2013.01); *G01C 3/085* (2013.01); *G01S 13/93* (2013.01);
(Continued)

(58) Field of Classification Search
CPC .......... G01S 13/86; G01S 13/93; G01S 13/89; G06T 7/55; G06T 2207/10021;
(Continued)

(56) References Cited

U.S. PATENT DOCUMENTS

2007/0286475 A1* 12/2007 Sekiguchi .......... G06K 9/00369
382/154
2014/0218228 A1* 8/2014 Noda .................... G01S 13/931
342/147

(Continued)

FOREIGN PATENT DOCUMENTS

JP 2006-343813 A 12/2006
JP 2007-310741 A 11/2007
(Continued)

OTHER PUBLICATIONS

Zhiaquiang Hou, A target Tracking System based on Radar and Image fusion (Year: 2003).*
Hyunggi Cho, A Multi-sensor fusion System for Moving Object Detection and Tracking in Urban Driving Environment (Year: 2014).*
International Search Report and English translation thereof dated Nov. 1, 2016 in connection with International Application No. PCT/JP2016/077434.
(Continued)

*Primary Examiner* — Michael P Nghiem
*Assistant Examiner* — Dacthang P Ngo
(74) *Attorney, Agent, or Firm* — Wolf, Greenfield & Sacks, P.C.

(57) ABSTRACT

A likelihood calculation unit calculates, from information obtained by each of movement detection methods including a movement detection method for detecting a movement amount of an object using an image and one or more different movement detection methods, movement amount likelihoods with regard to which the movement amount of (Continued)

an object is each of a plurality of movement amounts. An integration unit integrates the movement amount likelihoods according to the plurality of movement detection methods to determine integration likelihoods individually of the plurality of movement amounts. The present technology can be applied, for example, to a case in which a movement amount of an object is determined and a driver who drives an automobile is supported using the movement amount.

5 Claims, 21 Drawing Sheets

(51) Int. Cl.
G01C 3/08 (2006.01)
G01S 13/86 (2006.01)
G06T 7/55 (2017.01)
G08G 1/16 (2006.01)

(52) U.S. Cl.
CPC ............... *G06T 7/55* (2017.01); *G08G 1/16* (2013.01); *G06T 2207/10021* (2013.01); *G06T 2207/10028* (2013.01); *G06T 2207/20076* (2013.01)

(58) Field of Classification Search
CPC ......... G06T 2207/20076; G06T 2207/10028; G01B 11/00; G08G 1/16; G01C 3/085
USPC ....................................................... 702/150
See application file for complete search history.

(56) References Cited

U.S. PATENT DOCUMENTS

| 2015/0217765 | A1* | 8/2015 | Tokoro | G01S 13/867 701/1 |
| 2015/0234044 | A1* | 8/2015 | Ouchi | G01S 13/93 342/118 |
| 2016/0349358 | A1* | 12/2016 | Noda | G01S 7/412 |
| 2017/0038466 | A1* | 2/2017 | Salmen | G08G 1/166 |

FOREIGN PATENT DOCUMENTS

JP 2008-234350 A 10/2008
JP 2014-153874 A 8/2014

OTHER PUBLICATIONS

Mori et al., An Environment Modeling Method by Sensor Fusion for an Indoor Mobile Robit [Sensor Fusion ni yoru Okunai Ido Robot No. Tameno Kankyo Model Kochiku Shuho], The Transactions of Electrical Engineers of Japan C, May 20, 1994, vol. 114-C, No. 5, pp. 603-608.
Written Opinion and English translation thereof dated Nov. 1, 2016 in connection with International Application No. PCT/JP2016/077434.
International Preliminary Report on Patentability and English translation thereof dated Apr. 12, 2018 in connection with International Application No. PCT/JP2016/077434.
Franke et al., 6d-vision: Fusion of stereo and motion for robust environment perception. Lecture notes in computer science. Jan. 1, 2005. DAGM 2005. 3663:216-23.
Geiger et al., Object flow: A descriptor for classifying traffic motion. 2010 IEEE Intelligent Vehicles Symposium. Jun. 21, 2010:287-93.

* cited by examiner

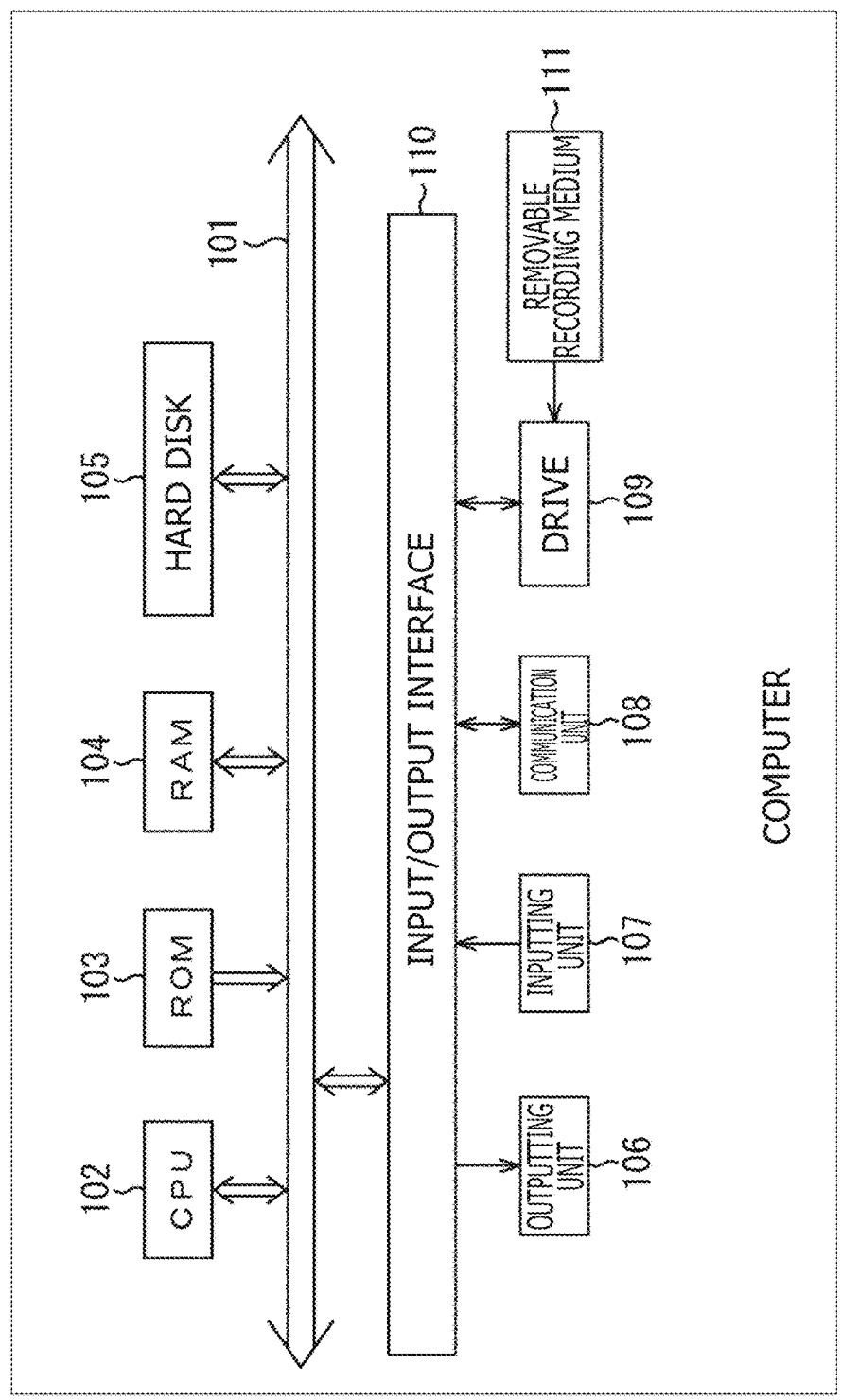

INFORMATION PROCESSING APPARATUS, INFORMATION PROCESSING METHOD AND PROGRAM

CROSS-REFERENCE TO RELATED APPLICATIONS

This application claims the benefit under 35 U.S.C. § 371 as a U.S. National Stage Entry of International Application No. PCT/JP2016/077434, filed in the Japanese Patent Office as a Receiving Office on Sep. 16, 2016, which claims priority to Japanese Patent Application Number JP2015-193365, filed in the Japanese Patent Office on Sep. 30, 2015, each of which is hereby incorporated by reference in its entirety.

TECHNICAL FIELD

The present technology relates to an information processing apparatus, an information processing method and a program, and particularly to an information processing apparatus, an information processing method and a program by which, for example, a movement amount of an object can be determined with high accuracy.

BACKGROUND ART

A technology of an ADAS (Advanced Driver Assistance System) or the like has been proposed which determines, from sensor data outputted from a sensor such as a camera or a millimeter wave radar incorporated in a vehicle such as, for example, an automobile, a distance to an object outside the vehicle or an amount of movement of the object and supports the driver who drives the vehicle using the distance or the amount of movement.

The distance or the amount of movement determined from sensor data of a sensor such as a camera or a millimeter wave radar varies in accuracy, for example, depending upon an environment, an object of a sensing target or the like. Therefore, a technology called fusion has been proposed recently which determines a distance or an amount of movement comprehensively using sensor data of a plurality of (kinds of) sensors such as a camera and a millimeter wave radar incorporated in a vehicle.

For example, PTL 1 proposes the following technology. In particular, for each of a plurality of sensors, the probability of existence of a three-dimensional object is calculated on the basis of a normal distribution centered at a true value of the output value of the sensor, and the probability of existence is corrected on the basis of the recognition rate of the sensor. Then, the probabilities of existence after corrected in regard the individual sensors are fused to set a total existence probability.

CITATION LIST

Patent Literature

[PTL 1]
JP 2007-310741A

SUMMARY

Technical Problem

Recently, it is demanded to propose a technology that makes it possible to determine the movement amount of the object with high accuracy.

The present technology has been made in such a situation as described above and makes it possible to determine the movement amount of the object with high accuracy.

Solution to Problem

The information processing apparatus or the program of the present technology is an information processing apparatus including a likelihood calculation unit configured to calculate, from information obtained by each of movement detection methods including a movement detection method for detecting a movement amount of an object using an image and one or more different movement detection methods, movement amount likelihoods with regard to which the movement amount of an object is each of a plurality of movement amounts, and an integration unit configured to integrate the movement amount likelihoods according to the plurality of movement detection methods to determine integration likelihoods individually of the plurality of movement amounts, or a program for causing a computer to function as the information process apparatus.

The information processing method of the present technology is an information processing method including calculating, from information obtained by each of movement detection methods including a movement detection method for detecting a movement amount of an object using an image and one or more different movement detection methods, movement amount likelihoods with regard to which the movement amount of an object is each of a plurality of movement amounts, and integrating the movement amount likelihoods according to the plurality of movement detection methods to determine integration likelihoods individually of the plurality of movement amounts.

In the information processing apparatus, information method and program of the present technology, from information obtained by each of movement detection methods including a movement detection method for detecting a movement amount of an object using an image and one or more different movement detection methods, movement amount likelihoods with regard to which the movement amount of an object is each of a plurality of movement amounts are calculated. Then, the movement amount likelihoods according to the plurality of movement detection methods are integrated to determine integration likelihoods individually of the plurality of movement amounts.

It is to be noted that the information processing apparatus may be an independent apparatus or may be an internal block configuring one apparatus.

Further, the program can be provided by transmitting the same through a transmission medium or by recording the same on a recording medium.

Advantageous Effect of Invention

With the present technology, the movement amount of the object can be determined with high accuracy.

It is to be noted that the effect described here is not necessarily restrictive but may be any one of effects described herein.

BRIEF DESCRIPTION OF DRAWINGS

FIG. 21 is block diagram depicting an example of a configuration of one embodiment of a computer to which the present technology is applied.

DESCRIPTION OF EMBODIMENT

Figure 1:
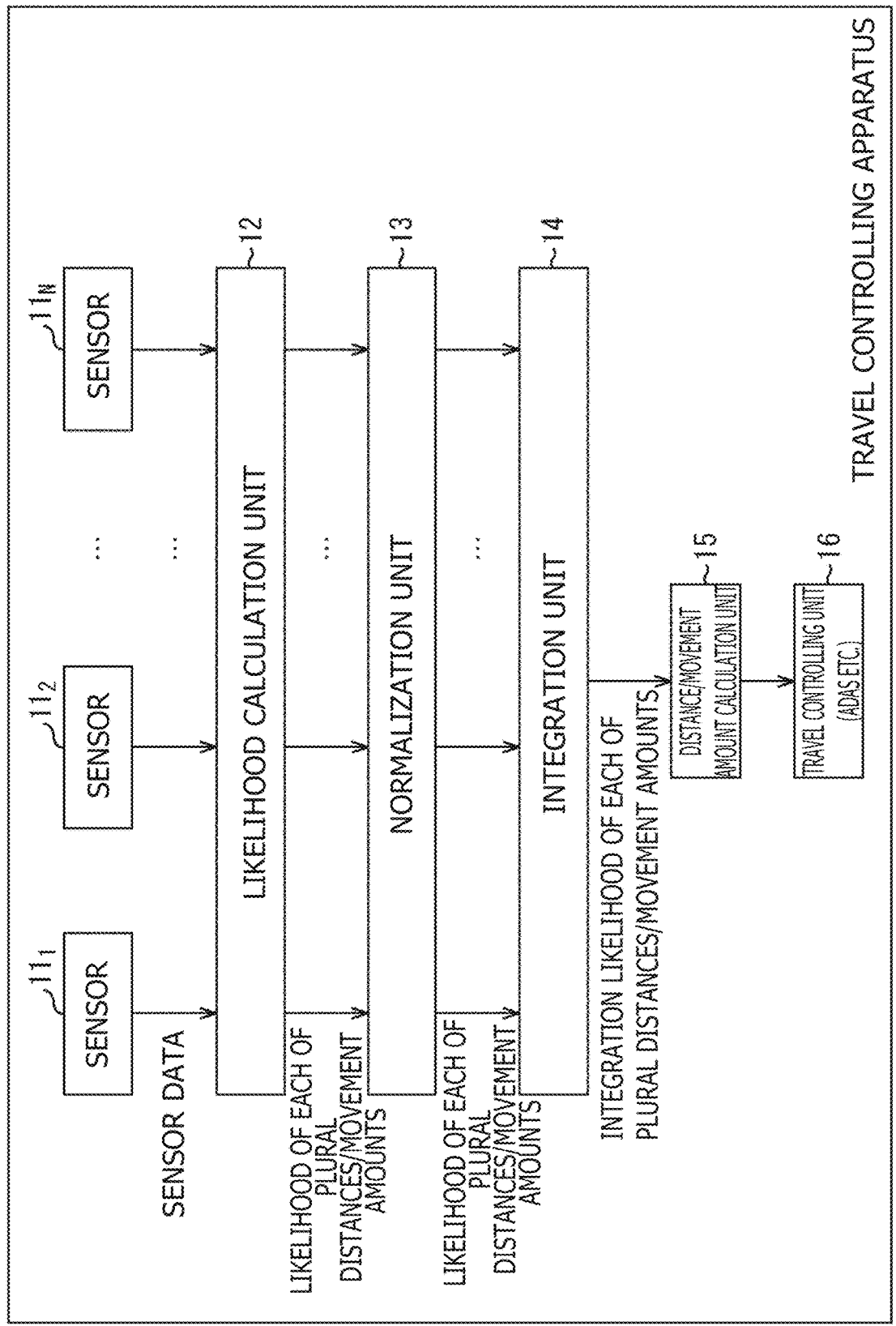
FIG. 1 is a block diagram depicting an outline of an example of a configuration of an embodiment of a travel controlling apparatus to which the present technology is applied.

Outline of Embodiment of Travel Controlling Apparatus to which Present Technology is Applied FIG. 1 is a block diagram depicting an outline of an example of a configuration of an embodiment of a travel controlling apparatus to which the present technology is applied.

The travel controlling apparatus is incorporated in a mobile body such as, for example, a vehicle such as an automobile, a ship, a submarine, an air plane or a drone and controls travel (movement) of the mobile body.

It is to be noted that it is assumed that, in the present embodiment, the travel controlling apparatus is incorporated, for example, in an automobile.

In FIG. 1, the travel controlling apparatus includes a plurality of, N, sensors $11_1$, $11_2$, ..., $11_N$, a likelihood calculation unit 12, a normalization unit 13, an integration unit 14, a distance/movement amount calculation unit 15, and a travel controlling unit 16.

The travel controlling apparatus performs various kinds of travel control for supporting a driver who drives the automobile in which the travel controlling apparatus is incorporated.

The sensor $11_n$ (n=1, 2, ..., N) is a sensor used for distance measurement of a predetermined distance measurement method or detection of a movement amount of a predetermine movement detection method, and senses a predetermined physical quantity and supplies sensor data that are a result of the sensing to the likelihood calculation unit 12.

Here, for the sensor $11_n$, for example, a single-lens camera, a multi-eye camera such as a stereo camera, a radar such as a millimeter wave radar, a ToF (Time of Flight) sensor, a LIDAR (light detection and ranging) and other arbitrary sensors that can perform light measurement or detection of a movement amount can be adopted.

Further, the sensor $11_n$ and another sensor $11_{n'}$ (n≠n') are sensors of different types. Accordingly, they are used for distance measurement of different distance measurement methods or detection of a movement amount by different movement detection methods.

Since the travel controlling apparatus of FIG. 1 includes such a plurality of sensors $11_1$ to $11_N$ as described above, namely, a plurality of (types of) sensors $11_1$ to $11_N$ used for distance measurement of different distance measurement methods or for detection of a movement amount by different movement detection methods, distance measurement by a plurality of (types of) distance measurement methods or detection of a movement amount by a plurality of (types of) movement detection methods is performed.

Accordingly, one distance measurement method or one movement detection method corresponds to one sensor $11_n$.

It is to be noted that the sensors $11_1$ to $11_N$ are arranged at a front portion of a ceiling in a room of an automobile or at an end portion or the like of a windshield of an automobile and output sensor data for determining a distance to an object in front of the automobile or a movement amount of the object.

The likelihood calculation unit 12 calculates, for each of the plurality of, namely, N, sensors $11_1$ to $11_N$, distance likelihoods that the distance to an object individually is a plurality of distances from sensor data of the sensor $11_n$ (sensor data outputted from the sensor $11_n$).

In particular, it is assumed now that, from sensor data of the sensor $11_n$, a distance within a range from 0 to $\Delta Z \times K$ in can be detected in accuracy of $\Delta Z$. The likelihood calculation unit 12 calculates distance likelihoods that the distance to an object individually is a plurality of, namely, K+1, distances 0, $\Delta Z$, $\Delta Z \times 2$, ..., $\Delta Z \times K$.

It is to be noted that the different sensors $11_n$ and $11_{n'}$ sometimes are different in accuracy or range of the distance that can be detected by them, and accordingly, the plurality of distances for which the distance likelihood is calculated sometimes differ from each other.

The likelihood calculation unit 12 calculates, for each of the plurality of sensors $11_1$ to $11_N$, distance likelihoods that the distance to an object individually is a plurality of distances and besides calculates movement amount likelihoods that the movement amount of the object individually is a plurality of movement amounts from sensor data of the sensor $11_n$.

The likelihood calculation unit 12 supplies distance likelihoods each of a plurality of distances and movement amount likelihoods each of a plurality of movement amounts calculated for each of the plurality of sensors $11_1$ to $11_N$ to the normalization unit 13.

The normalization unit 13 normalizes the distance likelihoods each of the plurality of distances for each of the plurality of sensors $11_1$ to $11_N$ from the likelihood calculation unit 12.

Here, as described hereinabove, a plurality of distances with regard to which a distance likelihood is calculated sometimes differ between the different sensor $11_n$ and sensor $11_{n'}$.

In particular, assuming now that K≠K' and ΔZ≠ΔZ', for the sensor $11_n$, distance likelihoods of K+1 distances 0, ΔZ, ΔZx2, ..., ΔZ×K are determined, and for the sensor $11_{n'}$, distance likelihoods of K'+1 distances 0, ΔZ', ΔZ'×2, ..., ΔZ'×K' are sometimes determined.

As described above, between the different sensor $11_n$ and sensor $11_{n'}$, so to speak, the granularity of a distance of which a distance likelihood is calculated or of a plurality of distances of which a distance likelihood is calculated differs.

Therefore, the normalization unit 13 performs normalization for making a plurality of distances, with regard to which a distance likelihood exists, for all of the N sensors $11_1$ to $11_N$.

The normalization can be performed by up sampling for increasing the number of a plurality of distances (corresponding to K or K' described hereinabove) with regard to which a distance likelihood exists, for example, by interpolation.

The normalization 13 performs also normalization of movement amount likelihoods each of a plurality of movement amounts according to the N sensors $11_1$ to $11_N$ from the likelihood calculation unit 12 in a similar manner as in the normalization of distance likelihoods.

Then, the normalization unit 13 supplies the distance likelihoods and the movement amount likelihoods after the normalization according to the N sensors $11_1$ to $11_N$ to the integration unit 14.

The integration unit 14 integrates distance likelihoods each of the plurality of distances individually according to the N sensors $11_1$ to $11_N$ for each of the plurality of distances.

In particular, if a certain distance z from among a plurality of distances with regard to which a distance likelihood after normalization exists is determined as a noticed distance z that is noticed, then after the normalization by the normalization unit 13, a distance likelihood of the noticed distance z exists in regard to all of the N sensors $11_1$ to $11_N$.

The integration unit 14 integrates the distance likelihood of the noticed distance z regarding the N sensors $11_1$ to $11_N$, namely, N distance likelihoods, to determine an integration likelihood of the noticed distance z.

Here, the integration of the N distance likelihoods can be performed, for example, by the Bayesian system, namely, by taking the product of the N distance likelihoods (where the distance likelihoods are log-likelihoods, by taking the sum).

Further, the integration of the N distance likelihoods can be performed by performing learning of a learning model in which, for example, N distance likelihoods are inputted and one integration likelihood is outputted in advance and providing N distance likelihoods as inputs to the learning model.

The integration unit 14 integrates distance likelihoods each of a plurality of distances according to the N sensors $11_1$ to $11_N$ for each of the plurality of distances to determine integration likelihoods each of the plurality of distances and supplies the determined integration likelihoods to the distance/movement amount calculation unit 15.

Further, the integration unit 14 integrates movement amount likelihoods each of a plurality of movement amounts according to the N sensors $11_1$ to $11_N$ for each of the plurality of movement amounts in a similar manner as in the integration of distance likelihoods and supplies the integration likelihoods each of the plurality of movement amounts obtained by the integration to the distance/movement amount calculation unit 15.

The distance/movement amount calculation unit 15 uses the integration likelihoods each of the plurality of distances from the integration unit 14 to determine the distance to the object and supplies the distance to the travel controlling unit 16. In particular, the distance/movement amount calculation unit 15 determines, for example, the distance of the highest integration likelihood from among the integration likelihoods each of the plurality of distances from the integration unit 14 as the distance to the object and supplies the distance to the travel controlling unit 16.

Further, the distance/movement amount calculation unit 15 uses the integration likelihoods each of the plurality of movement amounts from the integration unit 14 to determine the movement amount the object and supplies the movement amount to the travel controlling unit 16. In particular, the distance/movement amount calculation unit 15 determines, for example, the movement amount of the highest integration likelihood from among the integration likelihoods each of the plurality of movement amounts from the integration unit 14 as the movement amount of the object and supplies the movement amount to the travel controlling unit 16.

The travel controlling unit 16 performs travel control of the automobile using the distance to the object or the movement amount of the object supplied from the distance/movement amount calculation unit 15 as occasion demands.

In particular, the travel controlling unit 16 uses the distance to the object or the movement amount of the object supplied from the distance/movement amount calculation unit 15 as occasion demands to generate, for example, an obstacle map as obstacle information regarding an obstacle existing in front of the automobile. Then, the travel controlling unit 16 performs warning of existence of an obstacle, control of a brake and so forth.

Figure 2:
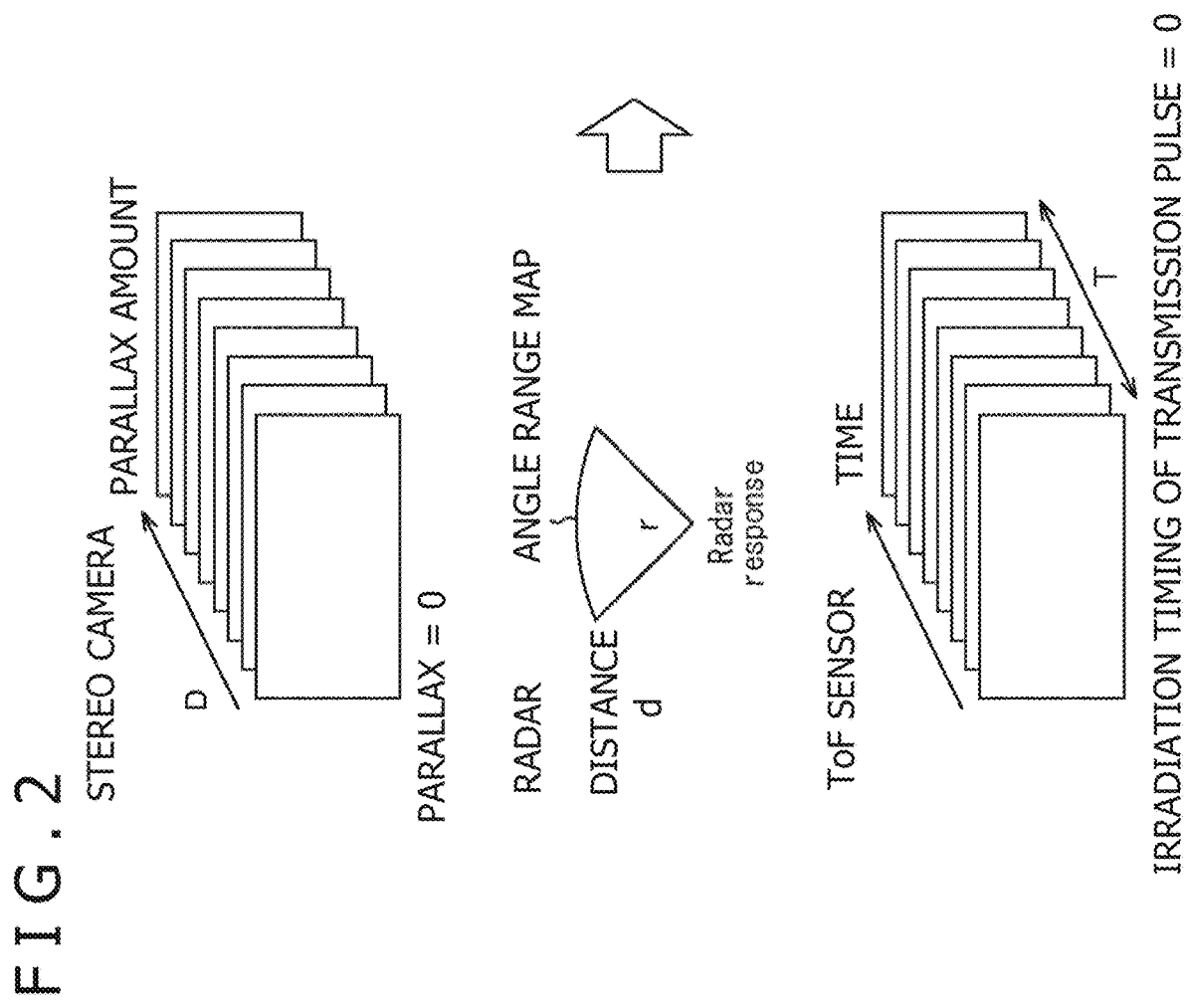
FIG. 2 is a view illustrating sampling points.

FIG. 2 is a view illustrating sampling points.

Here, the sampling point signifies a position (point) for which a distance likelihood or a movement amount likelihood is calculated by the likelihood calculation unit 12 of FIG. 1.

Further, it is assumed that, while the sensor $11_n$ has a reception unit (light reception unit) for receiving a signal of light or the like (receiving light) as a physical quantity that is a target of sensing, in the present embodiment, a three-dimensional position (x, y, z) and a two-dimensional position (x, y) are represented depending upon a three-dimensional (Cartesian) coordinate system whose z direction is defined as a forward direction of the automobile in which the travel controlling apparatus of FIG. 1 is incorporated and whose x direction and y direction are defined as a horizontal direction (leftward and rightward direction) and a vertical direction (upward and downward direction) on a plane that is orthogonal to the z direction and passes a reception portion of the reception unit of the sensor $11_n$.

For example, where the sensor $11_n$ is a stereo camera, the position (x, y) represents the position of a pixel of an image (for example, a standard image hereinafter described) picked up by (one of two cameras configuring) the stereo camera, and the position (x, y, z) represents that the distance to an object reflected on the pixel at the position (x, y) is z.

The position (x, y, z) can be transformed into a position in a real space, namely, a position in a real space of an object reflected on the pixel at the position (x, y).

In the following, a sampling point is described taking a distance likelihood as an example.

For example, if a certain sensor $11_n$ is a stereo camera, then two images having different visual points from each other are obtained as sensor data of the sensor $11_n$ that is a stereo camera.

If it is assumed that one of the two images is referred to as standard image and the other one of the two image is referred to as reference image, then for each pixel of the standard image, where the parallax from the reference image is parallax amounts D1, D2, . . . of different values, likelihoods of the parallax amounts D1, D2, . . . can be determined.

Now, if it is assumed that a certain pixel of the standard image is a noticed pixel to be noticed, then the distance likelihoods of the parallax amounts D1, D2, . . . when it is assumed that the parallax from the reference image is the parallax amounts D1, D2, . . . can be used as distance likelihoods of distances z1, z2, . . . when it is assumed that the distance to an object reflected on the noticed image is the distances z1, z2, . . . corresponding to the parallax amounts D1, D2, . . . , respectively.

Accordingly, for the position (x, y) of the noticed pixel, a distance likelihood when the distance z of the position (x, y) (distance z to an object reflected on the pixel at the position (x, y)) is the distances z1, z2, . . . can be obtained.

In this manner, a distance likelihood can be obtained for the position (x, y, z), and the position (x, y, z) for which a distance likelihood is obtained in this manner is a sampling point.

For example, where a certain sensor $11_n$ is a radar, from sensor data (angle range map) of the sensor $11_n$ that is a radar, a likelihood, when it is assumed that the distance d to an object in the directions r is distances d1, d2, . . . , of each of the distances d1, d2, . . . can be determined as distance likelihood.

In the radar, the direction r and the distance d in and at which a distance likelihood can be obtained are an argument angle and a distance in a polar coordinate system, respectively, and the position at the distance d in the direction r can be transformed into a position (x, y, z) of a three-dimensional coordinate system by coordinate transformation.

Accordingly, also in the radar, where a position (x, y, z) in a three-dimensional coordinate system is a sampling point, a distance likelihood can be obtained for the sampling point similarly as in the case of the stereo camera.

For example, if a certain sensor $11_n$ is a ToF sensor, then in the ToF sensor, for example, a large number of transmission pulses irradiated at a high speed are received by a plurality of reception units arranged in a matrix. Then, from the reception signal that is a transmission pulse received by each of the reception units, a distance L of the position (x, y) of the reception unit (distance to an object by which a transmission pulse corresponding to a reception signal received by the reception unit at the position (x, y) is reflected) is determined.

In the ToF sensor, a plurality of distances L are determined individually from a plurality of reception signals received by a reception unit from a plurality of transmission pulses transmitted within a period of time frame T as a predetermined period T of time. Then, an average value or the like of the plurality of distances L obtained within the period of the time frame T is determined as a final distance z of the position (x, y) of the light reception unit.

If the sensor $11_n$ is a ToF sensor, then a plurality of distances L determined, for example, within the period of the time frame T can be obtained as sensor data of the sensor $11_n$ that is a ToF sensor.

Then, on the basis of a distribution of the plurality of distances L in the time frame T, distance likelihoods when the distance of the position (x, y) of the light reception unit is the distances z1, z2, . . . can be obtained.

Accordingly, also in the ToF sensor, where a position (x, y, z) in a three-dimensional coordinate system is a sampling point, a distance likelihood can be obtained for the sampling point similarly as in the case of the stereo camera.

It is to be noted that, between the different sensors $11_n$ and $11_{n'}$, namely, for example, between two arbitrary sensors from among the stereo camera, radar and ToF sensor, the position (x, y, z) (and the granularity) of sampling points with regard to which a distance likelihood is determined sometimes differs from a difference or the distance measurement method or the like.

In the normalization unit 13 of FIG. 1, normalization that makes sampling points for which a distance likelihood exists coincide with each other in regard to all of the N sensors $11_1$ to $11_N$ is performed, by up sampling that increases the number of sampling points, for example, by interpolation.

In FIG. 2, for a stereo camera, a radar and a ToF sensor as the three sensors $11_1$ to $11_3$, normalization for normalizing the granularities of sampling points in the x, y and z directions is performed to become predetermined $\Delta x$, $\Delta y$, and $\Delta z$.

By such normalization as described above, sampling points for a distance likelihood that can be obtained individually from the stereo camera, radar and ToF sensor of different distance measurement methods are made coincide with each other.

As a result, the integration unit 14 of FIG. 1 can integrate distance likelihoods obtained from the stereo camera, radar and ToF sensor of different distance measurement methods in unit of a sampling point to determine an integration likelihood for each sampling point.

The foregoing similarly applies also the movement amount likelihood.

It is to be noted that, although, as regards the distance likelihood, a likelihood of the distance z is determined in regard to a position (x, y, z) as a position in a three-dimensional coordinate system, as regards the movement amount likelihood, if the movement amounts in the x, y and z directions are represented by vx, vy and vz, then a likelihood of the movement amount (vx, vy, vz) is determined with regard to a sampling point (x, y, z, vx, vy, vz) as a position in a six-dimensional (Cartesian) coordinate system.

Figure 3:
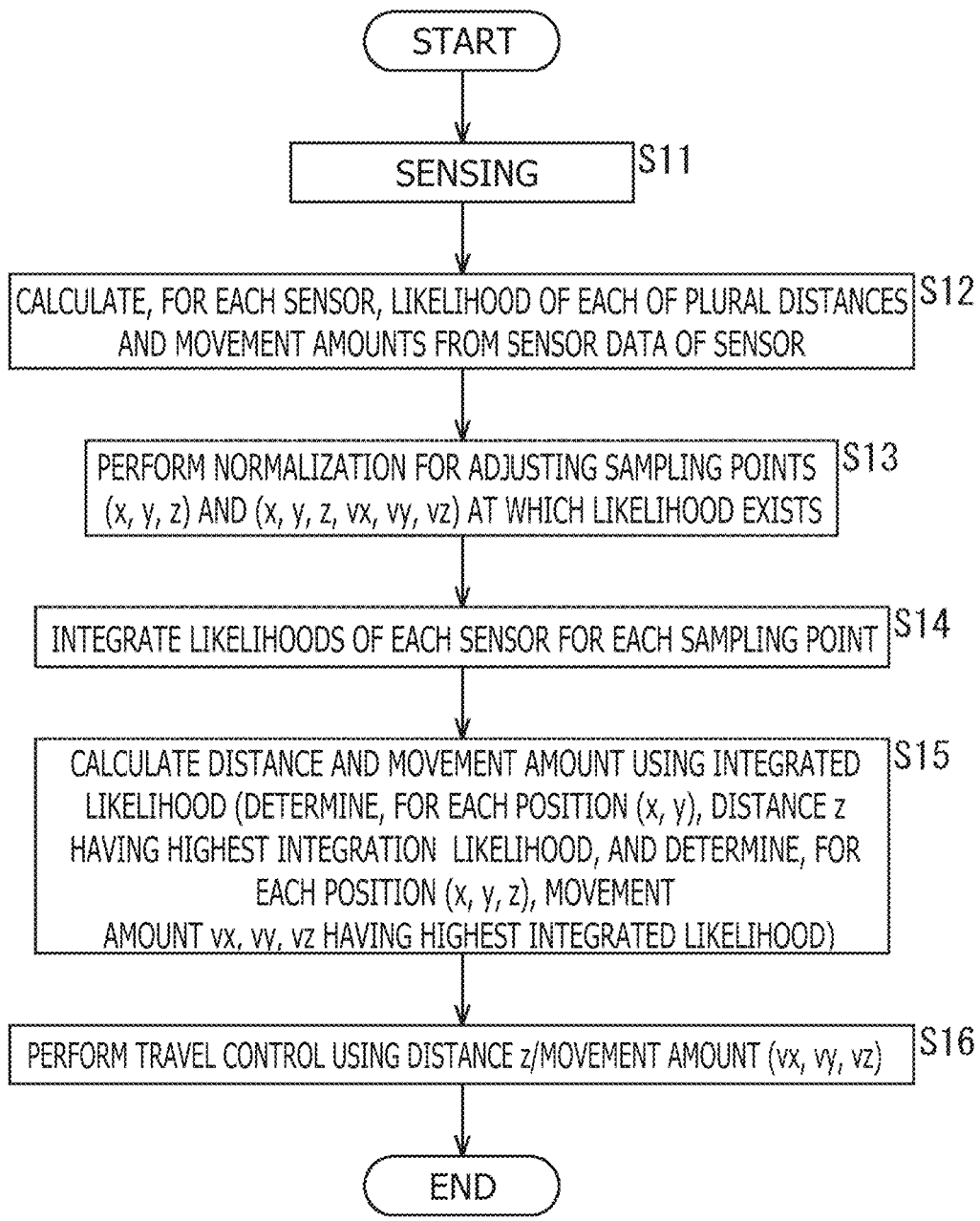
FIG. 3 is a flow chart illustrating an example of processing of the travel controlling apparatus.

FIG. 3 is a flow chart illustrating an example of processing of the travel controlling apparatus of FIG. 1.

At step S11, the N sensors $11_1$ to $11_N$ perform sensing and supply sensor data obtained as a result of the sensing to the likelihood calculation unit 12, whereafter the processing advances to step S12.

At step S12, the likelihood calculation unit 12 calculates, for each of the N sensors $11_1$ to $11_N$, a distance likelihood of each of a plurality of distances z and a movement amount likelihood of each of a plurality of movement amounts (vx, vy, vz) from the sensor data of the sensor $11_n$. Then, the likelihood calculation unit 12 supplies the distance likelihoods of the plurality of distances z and the movement amount likelihoods of the plurality of movement amounts (vx, vy, vz) in regard to the sensors $11_1$ to $11_N$ to the normalization unit 13. Then, the processing advances from step S12 to step S13.

At step S13, the normalization unit 13 performs, for the distance likelihoods according to the plurality of sensors $11_1$ to $11_N$ from the likelihood calculation unit 12, normalization for adjusting the sampling points (x, y, z) with regard to which a distance likelihood exists (for making such sampling points (x, y, z) coincide with each other).

Further, the normalization unit 13 performs, for the movement amount likelihoods according to the plurality of sensors $11_1$ to $11_N$ from the likelihood calculation unit 12, normalization for arranging the sampling points (x, y, z, vx, vy, vz) with regard to which a movement amount likelihood exists.

Then, the normalization unit 13 supplies the distance likelihoods and the movement amount likelihoods after the normalization according to the plurality of sensors $11_1$ to $11_N$ to the integration unit 14. Then, the processing advances from step S13 to step S14.

It is to be noted that normalization for arranging the sampling points (x, y, z) for a distance likelihood according to the plurality of sensors $11_1$ to $11_N$ can be performed such that the number of sampling points (x, y, z) in each direction of the sampling points (x, y, z), namely, in each of the x direction, y direction and z direction, is adjusted to a maximum distance likelihood.

In particular, for example, if it is assumed now that two sensors of a stereo camera and a radar are adopted as the plurality of sensors $11_1$ to $11_N$, then the resolution of the distance z determined from (sensor data of) the stereo camera is lower than the resolution of the distance z determined from the radar.

Therefore, in the normalization of the distance likelihood according to the stereo camera, the number (of the sampling points (x, y, z)) for a distance likelihood according to the stereo camera is increased by interpolation such that the positions and the number in the z direction of the sampling points (x, y, z) for a distance likelihood according to the stereo camera are adjusted to the positions and the number in the z direction of the sampling points (x, y, z) for a distance likelihood according to the radar.

Further, in regard to the radar, since the angular resolution that is a resolution of a direction (orientation) is low, on a three-dimensional coordinate system, the resolutions in the x direction and the y direction of the radar are lower than the resolutions in the x direction and the y direction of the stereo camera.

Therefore, in the normalization of the distance likelihood according to the radar, the number (of the sampling points (x, y, z)) for a distance likelihood according to the radar is increased by interpolation such that the positions and the numbers in the x direction and the y direction of the sampling points (x, y, z) for a distance likelihood according to the radar are adjusted to the positions and the numbers in the x direction and the y direction of the sampling points (x, y, z) for a distance likelihood according to the stereo camera.

Here, normalization of the distance likelihood can be performed by a method other than interpolation.

For example, in regard to the stereo camera, by performing detection of a parallax with accuracy finer than the accuracy of pixels, it is possible to improve the resolution of the distance z, namely, to increase the number in the z direction of sampling points (x, y, z) for a distance likelihood according to the stereo camera. Consequently, the positions and the number in the z direction of sampling points (x, y, z) according to the stereo camera can be adjusted to the positions and the number in the z direction of the sampling points (x, y, z) for a distance likelihood according to the radar.

Further, for example, in regard to the radar, by using a super resolution technology in the time direction, it is possible to increase the angular resolution, namely, to increase the number in the x direction (and the y direction) of sampling points (x, y, z) for a distance likelihood according to the radar, and consequently, the positions and the number in the x direction of sampling points (x, y, z) for a distance likelihood according to the radar can be adjusted to the positions and the number in the x direction of sampling points (x, y, z) for a distance likelihood according to the stereo camera.

It is to be noted that increase in number of sampling points (x, y, z) for a distance likelihood of the radar can be performed not on a three-dimensional coordinate system but on a polar coordinate system before the transformation into the three-dimensional coordinate system.

Further, increase in number of sampling points (x, y, z) can be performed in combination with detection of a parallax with accuracy finer than that of the pixels, a super resolution technology in the time direction and interpolation described hereinabove.

The foregoing similarly applies also to normalization of the movement amount likelihood.

At step S14, the integration unit 14 integrates the distance likelihoods according to the sensors $11_1$ to $11_N$ for each sampling point (x, y, z) to determine an integration likelihood for each sampling point (x, y, z). Further, the integration unit 14 integrates movement amount likelihoods according to the sensors $11_1$ to $11_N$ for each sampling point (x, y, z, vx, vy, vz) to determine an integration likelihood of the movement amount for each sampling point (x, y, z, vx, vy, vz).

Then, the integration unit 14 supplies the integration likelihoods of the distances and the movement amounts to the distance/movement amount calculation unit 15, and then the processing advances from step S14 to step S15.

At step S15, the distance/movement amount calculation unit 15 determines the distance to the object using the integration likelihood of the distance from the integration unit 14 and supplies the determined distance to the travel controlling unit 16. In particular, the distance/movement amount calculation unit 15 determines a distance z whose integration likelihood is highest for each position (x, y), for example, among the integration likelihoods of the distances for each sampling point (x, y, z) from the integration unit 14, and supplies the distance z to the travel controlling unit 16.

Further, the distance/movement amount calculation unit 15 determines the movement amount of the object using the integration likelihood of the movement amount from the integration unit 14 and supplies the movement amount of the object to the travel controlling unit 16. In particular, the distance/movement amount calculation unit 15 determines, for example, among the integration likelihoods of the movement amounts for each sampling amount (x, y, z, vx, vy, vz) from the integration unit 14, a movement amount (vx, vy, vz) whose integration likelihood is highest for each position (x, y, z), or determines a movement amount (vx, vy, vz) and a distance z whose integration likelihood of the movement amount is greatest, and supplies the movement amount (vx, vy, vz) and the distance z to the travel controlling unit 16.

Then, the processing advances from step S15 to step S16, at which the travel controlling unit 16 performs travel control of the automobile using the distance z or the movement amount (vx, vy, vz) supplied from the distance/movement amount calculation unit 15 as occasion demands, whereafter the processing is ended.

It is to be noted that the processing in accordance with the flow chart of FIG. 3 is executed repetitively in pipeline.

Figure 4:
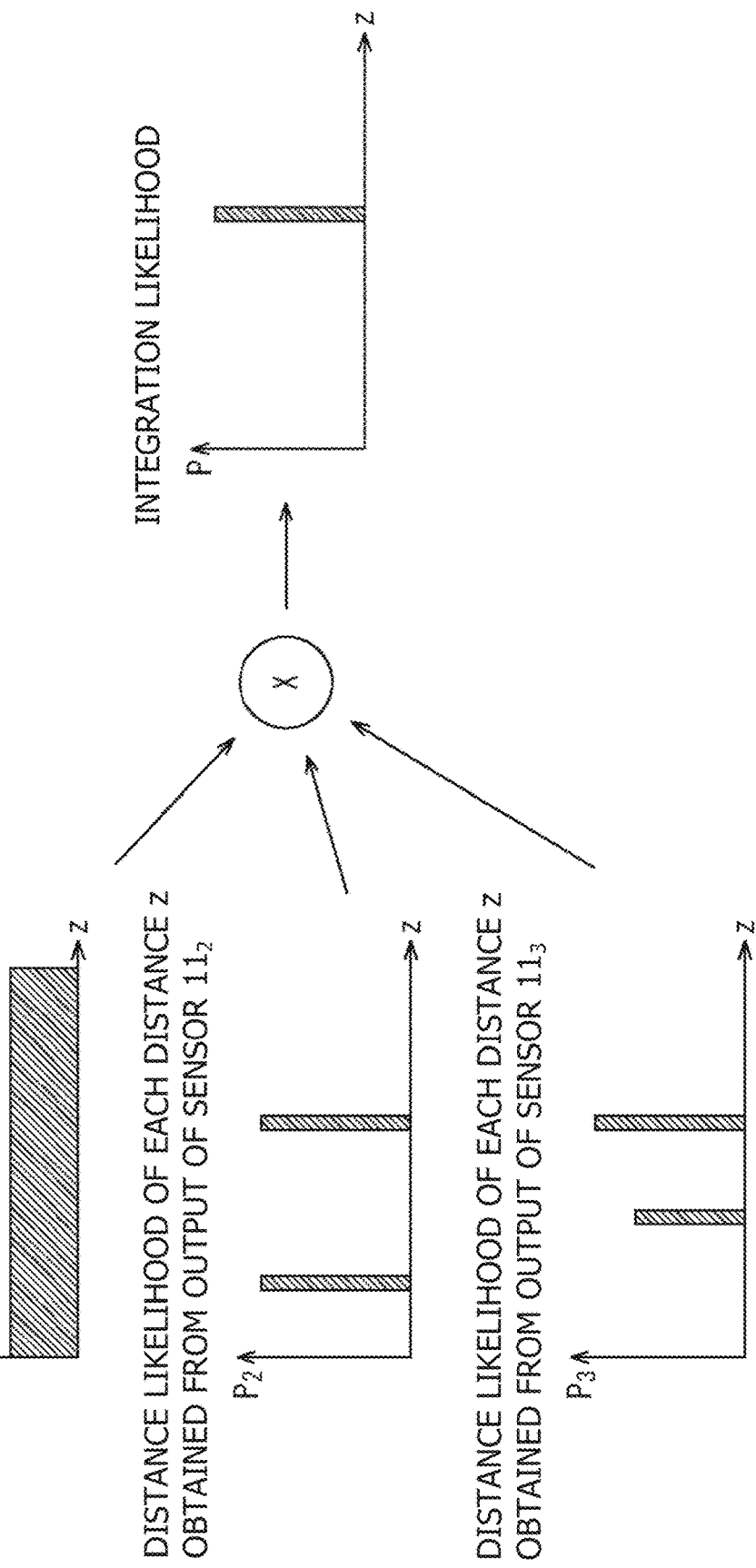
FIG. 4 is a view illustrating an effect of an integration method.

FIG. 4 is a view illustrating an effect of a method (hereinafter referred to as integration method) that determines a distance to an object or a movement amount of an object using an integration likelihood obtained by integrating distance likelihoods or movement amount likelihoods for each of the sensors $11_1$ to $11_N$.

As described hereinabove with reference to FIG. 1, as the sensor $11_n$, for example, a stereo camera or a millimeter wave radar can be adopted.

The stereo camera and the millimeter wave radar can measure the distance to an object (perform distance measurement).

Incidentally, since the stereo camera performs distance measurement by detecting a parallax between images, at a dark place, the accuracy in distance measurement degrades. Further, in the stereo camera, as the distance increases, the resolution (resolution) of the distance degrades, and the accuracy in distance measurement varies depending upon the texture (design) of the object. Further, in the stereo camera, the accuracy in distance measurement degrades depending upon the external environment such as rain, slow or backlight.

On the other hand, since the millimeter wave radar performs distance measurement by transmitting a millimeter wave and receiving reflection light of the millimeter wave reflected by an object, it is vulnerable to multiple reflection in a tunnel or the like, and a ghost sometimes appears in an environment in which multiple reflection (multipath) occurs. The ghost sometimes appears depending upon the position or the posture of an object of a target of the distance measurement. Further, in the millimeter wave radar, the resolution in distance measurement of a position in a vertical direction (resolution in the y direction) is low, and it is sometimes difficult to perform distance measurement whose target is an obstacle whose angle is shallow with respect to the millimeter wave to be transmitted like a road surface. Further, in the millimeter wave radar, the angular resolution that is a resolution in a direction (orientation) and the accuracy in distance measurement varies depending upon the material of the object that is a target of the distance measurement.

Accordingly, when distance measurement is performed only using the stereo camera or when distance measurement is performed only using the millimeter wave radar, the accuracy in distance measurement occurs less frequently.

Incidentally, the case in which the accuracy in distance measurement degrades is different between or among a plurality of sensors of different distance measurement methods like a stereo camera and a millimeter wave radar.

Therefore, in the integration method, by integrating distance likelihoods according to the sensors $11_1$ to $11_N$ and using an integration likelihood obtained as a result of the integration, the distance to the object is determined with high accuracy.

FIG. 4 depicts an example of distance likelihoods of each distance z obtained from three sensors $11_1$ to $11_3$ and an integration likelihood obtained by integrating the distance likelihoods regarding the three sensors $11_1$ to $11_3$.

In FIG. 4, reference characters $P_1$, $P_2$ and $P_3$ represent distance likelihoods according to the individual sensors $11_1$ to $11_3$.

The distance likelihood $P_n$ (here, n=1, 2, 3) is low at a distance at which the reliability is low. Further, in a case in which the accuracy in distance measurement of the sensor $11_n$ at which the distance likelihood $P_n$ is obtained degrades, distance likelihoods $P_n$ spread in low values within a wide range such as a range in which distance measurement is possible with the sensor $11_n$.

As a case in which the accuracy in distance measurement of the sensor $11_n$ degrades, for example, where the sensor $11_n$ is a stereo camera, a case in which distance measurement of the distance to an object reflected as a flat image is performed or the like is available. Meanwhile, where the sensor $11_n$ is a ToF sensor, a case in which distance measurement of the distance to a dark object or a like case corresponds to the case in which the accuracy in distance measurement of the sensor $11_n$ degrades. Furthermore, where the sensor $11_n$ is a radar, a case in which distance measurement is performed in a situation in which a multipath phenomenon occurs corresponds to the case in which the accuracy in distance measurement of the sensor $11_n$ degrades.

In FIG. 4, distance measurement is performed in a situation in which the accuracy in distance measurement of the sensor $11_1$ from among the sensors $11_1$ to $11_3$ degrades. Therefore, the distance likelihood according to the sensor $11_1$ spreads in low values over a wide range of the distance z.

In the integration method, the distance likelihoods $P_1$ to $P_3$ according to the sensors $11_1$ to $11_N$ are integrated to determine an integration likelihood P. In particular, for example, the product of the distance likelihoods $P_1$ to $P_3$ according to the sensors $11_1$ to $11_N$ is determined as the integration likelihood P.

Where the integration likelihood P is determined by taking the product of the distance likelihoods $P_1$ to $P_3$, the distance likelihood $P_1$ according to the sensor $11_1$ that is low in distance measurement, namely, the distance likelihood $P_1$ that spreads in low values, has little influence on the integration likelihood P of any distance z (has influences by a substantially equal amount).

Therefore, since the distance likelihood $P_1$ according to the sensor $11_1$ that is low in accuracy in distance measurement does not have an influence on superiority or inferiority of the integration likelihood P at each distance z, by calculating the distance z at which such integration likelihood P is highest as the distance to the object, it is possible as a result to determine the distance to the object without using (without relying upon) the sensor $11_1$, whose accuracy in distance measurement is low, namely, to determine the distance to the object with high accuracy.

Further, in the integration method, it is possible to perform distance measurement that is robust against the environment or the like or to perform distance measurement with a resolution that cannot be achieved by distance measurement in which only a single sensor is used.

For example, where distance measurement is performed only by a stereo camera, the long distance resolution (resolution) decreases. However, where a stereo camera and a radar are adopted as the two sensors $11_n$ and $11_{n'}$, as a resolution of the distance, a high resolution can be implemented even where the distance is great.

It is to be noted that the foregoing similarly applies also to a case in which movement amount likelihoods are integrated to determine an integration likelihood and a movement amount (vx, vy, vz) is determined using the integration likelihood.

Figure 5:
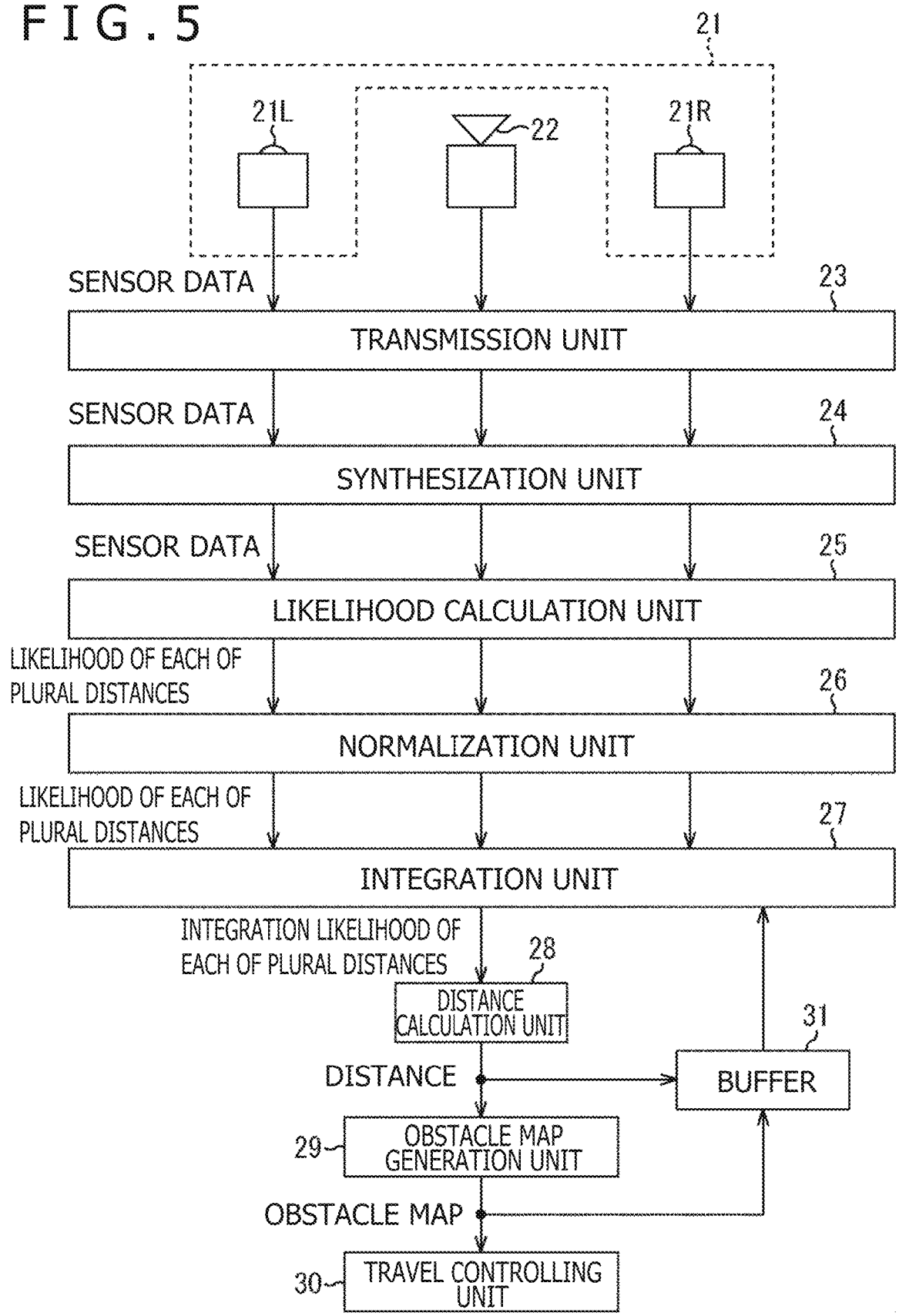
FIG. 5 is a block diagram depicting a first detailed configuration example of the travel controlling apparatus to which the present technology is applied.

First Detailed Configuration Example of Travel Controlling Apparatus to which Present Technology is Applied FIG. 5 is a block diagram depicting a first detailed configuration example of the travel controlling apparatus to which the present technology is applied.

In FIG. 5, the travel controlling apparatus includes a stereo camera 21, a millimeter wave radar 22, a transmission unit 23, a synchronization unit 24, a likelihood calculation unit 25, a normalization unit 26, an integration unit 27, a distance calculation unit 28, an obstacle map generation unit 29, a travel controlling unit 30 and a buffer 31.

The stereo camera 21 and the millimeter wave radar 22 correspond to the N sensors $11_1$ to $11_N$ of FIG. 1.

The stereo camera 21 has two cameras 21L and 21R. The cameras 21L and 21R pick up images from different points of view and output image data obtained by the image pickup as sensor data to the transmission unit 23.

The millimeter wave radar 22 sends a millimeter wave. If the millimeter wave sent from the millimeter wave radar 22 is reflected by an object and returns to the millimeter wave radar 22, then the millimeter wave radar 22 receives the returning millimeter wave. Then, the millimeter wave radar 22 outputs a reception signal that is the received millimeter wave as sensor data to the transmission unit 23.

The transmission unit 23 performs necessary processing for the sensor data outputted from (the cameras 21L and 21R of) the stereo camera 21 and the millimeter wave radar 22 and transmits (supplies) resulting data to the synchronization unit 24.

The transmission unit 23 performs, for example, a development process and so forth for the image data outputted from the stereo camera 21.

The synchronization unit 24 synthesizes the sensor data outputted form the stereo camera 21 and the millimeter wave radar 22 as the two different sensors and supplied from the transmission unit 23 with each other and outputs the synchronized sensor data to the likelihood calculation unit 25.

The likelihood calculation unit 25 corresponds to the likelihood calculation unit 12 of FIG. 1.

The likelihood calculation unit 25 calculates, from the sensor data of the stereo camera 21 from the synchronization unit 24, distance likelihoods according to the stereo camera 21 in regard to each sampling point (x, y, z), namely, in regard to each position (x, y) of each pixel of the image data as the sensor data of the stereo camera 21 and each distance z within a range of the distance that can be measured by the stereo camera 21, and supplies the distance likelihoods to the normalization unit 26.

Further, the likelihood calculation unit 25 calculates, from the sensor data of the millimeter wave radar 22 from the synchronization unit 24, distance likelihoods according to the millimeter wave radar 22 in regard to each sampling point (x, y) and supplies the distance likelihoods to the normalization unit 26.

In particular, the likelihood calculation unit 25 determines, from the sensor data of the millimeter wave radar 22 from the synchronization unit 24, a distance likelihood of each distance when it is assumed that the distance d to an object in each direction (orientation) r is each distance within a range of the distance that can be measured by the millimeter wave radar 22.

Then, the likelihood calculation unit 25 transforms each direction r and (the distance likelihood of) each distance d in a polar coordinate system from which a distance likelihood according to the millimeter wave radar 22 is obtained into (a distance likelihood of) each position (x, y, z) in the three-dimensional coordinate system by coordinate transformation, and supplies the distance likelihood of each sampling point (x, y, z) that is the position (x, y, z) in the three-dimensional coordinate system to the normalization unit 26.

The normalization unit 26 corresponds to the normalization unit 13 of FIG. 1.

The normalization unit 26 performs normalization for making the sampling points (x, y, z) from the likelihood calculation unit 25, coincide between the distance likelihoods of the sampling points (x, y, z) according to the stereo camera 21 and the distance likelihoods of the sampling points (x, y, z) according to the millimeter wave radar 22, and supplies the normalized sampling points (x, y, z) to the integration unit 27.

The integration unit 27 corresponds to the integration unit 14 of FIG. 1.

The integration unit 27 integrates the distance likelihoods according to the stereo camera 21 from the normalization unit 26 and the distance likelihoods according to the millimeter wave radar 22 for each sampling point (x, y, z) and supplies the integrated distance likelihoods to the distance calculation unit 28.

It is to be noted that the integration unit 27 can perform integration of the distance likelihoods according to the stereo camera 21 and the distance likelihoods according to the millimeter wave radar 22 using information stored in the buffer 31 as occasion demands.

The distance calculation unit 28 corresponds to the distance/movement amount calculation unit 15 of FIG. 1.

The distance calculation unit 28 determines the distance to the object using the integration likelihoods of the distances for each sampling point (x, y, z) from the integration unit 27. In particular, the distance calculation unit 28 determines, for each position (x, y), the distance z in regard to which the integration likelihood of the distance is in the maximum as the distance to the object reflected on the pixel at the position (x, y).

Then, the distance calculation unit 28 supplies the distance z of each position (x, y) determined using the integration likelihoods for a distance to the obstacle map generation unit 29 and the buffer 31.

The obstacle map generation unit 29 uses the distances z from the distance calculation unit 28 to generate an obstacle map as obstacle information regarding obstacles existing in front of the automobile. Then, the obstacle map generation unit 29 supplies the obstacle map to the travel controlling unit 30 and the buffer 31.

The travel controlling unit 30 corresponds to the travel controlling unit 16 of FIG. 1.

The travel controlling unit 30 uses the obstacle map from the obstacle map generation unit 29 to perform warning of the existence of an obstacle to the driver who drives the automobile, control of self-driving and so forth.

The buffer 31 temporarily stores the distances z of the individual positions (z, y) supplied from the distance calculation unit 28 and the obstacle map supplied from the obstacle map generation unit 29.

The distances z and the obstacle map stored in the buffer 31 are used by the integration unit 27 as occasion demands when the integration unit 27 performs next integration.

In particular, when the integration unit 27 performs integration of the distance likelihoods according to the stereo camera 21 and distance likelihoods according to the millimeter wave radar 22, it uses the distances z or the obstacle map determined in the preceding operation cycle and stored in the buffer 31 as occasion demands.

Here, since the number of sampling points (x, y, z) after the normalization of the distance likelihoods is very great, the integration by the integration unit 27 is processing of a high load.

The integration unit 27 reduces the load of the integration processing by using, upon integration, the distances z or the obstacle map determined in the preceding operation cycle.

For example, the integration unit 27 recognizes the shape of an object existing in front of the automobile from the obstacle map determined in the preceding operation cycle and estimates the existence range of the object upon integration in the current operation cycle from the speed of the automobile in which the travel controlling apparatus of FIG. 5 is incorporated.

Then, the integration unit 27 determines only sampling points (x, y, z) corresponding to points within the existence range of the object upon integration in the current operation cycle as a target of the integration of distance likelihoods and integrates the distance likelihoods according to the stereo camera 21 and the distance likelihoods according to the millimeter wave radar 22 to determine an integration likelihood.

On the other hand, as regards the other sampling pints, the integration unit 27 uses one of the distance likelihood according to the stereo camera 21 and the distance likelihood according to the millimeter wave radar 22 as it is as an integration likelihood.

In this case, since the integration is performed only for the sampling points (x, y, z) corresponding to the points in the existence range of the object, the number of sampling points (x, y, z) that become the target of integration decreases, and the load of the integration processing can be reduced.

Further, for example, the integration unit 27 recognizes the road surface from the obstacle map determined in the preceding operation cycle, and can exclude, in regard to the sampling points (x, y, z) corresponding to points on the road surface, the distance likelihoods according to a sensor, which is difficult to receive a signal reflected from the road surface and is low in accuracy in distance measurement targeted to a road surface like a radar, from the target of the integration.

In this case, since the number of distance likelihoods that become a target of the integration decreases, the load of the integration processing can be reduced.

Figure 6:
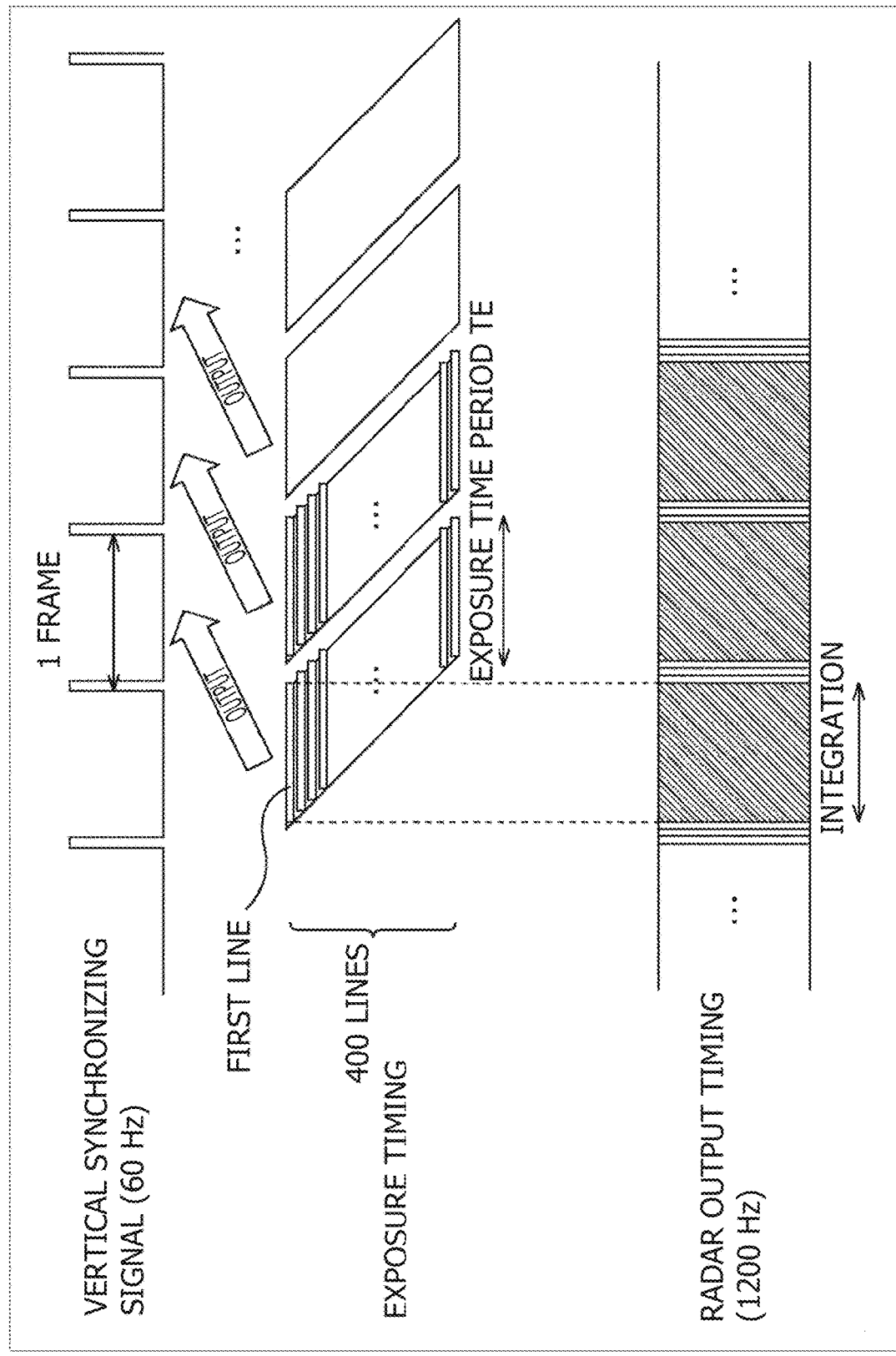
FIG. 6 is a view illustrating synchronization by a synchronization unit 24.

FIG. 6 is a view illustrating synchronization by the synchronization unit 24 of FIG. 5.

In the integration method, the distance likelihoods, for example, according to the stereo camera 21 and the millimeter wave radar 22 as the sensors $11_1$ to $11_N$ are individually integrated, and the resulting integration likelihoods are used to determine the distance to the object or the like. Therefore, it is necessary to synchronize sensor data of the stereo camera 21 and the millimeter wave radar 22 to be used to determine the distance likelihoods targeted to the integration with each other with a high degree of accuracy.

FIG. 6 depicts an example of synchronization between image data as sensor data outputted from the stereo camera 21 and sensor data outputted from the millimeter wave radar 22.

In FIG. 6, (the cameras 21L and 21R configuring) the stereo camera 21 includes, for example, a CMOS (Complemental Metal Oxide Semiconductor) image sensor not depicted and picks up an image having a 400 (horizontal) lines in one frame at a frame rate of 60 Hz.

Further, since the stereo camera 21 picks up images, for example, by a rolling shutter method, the exposure timing is gradually displaced (delayed) between different lines of one frame.

On the other hand, in FIG. 6, the millimeter wave radar 22 outputs sensor data, for example, at a cycle of 1200 Hz.

Accordingly, in FIG. 6, for one frame of image data outputted from the stereo camera 21, the millimeter wave radar 22 outputs 1200 sensor data.

Now, if it is assumed that the exposure time period for each line when the stereo camera 21 picks up an image of one frame is represented by TE, then the stereo camera 21 receives light for the exposure time period TE for each line of the image sensor, and results of the photoelectric transformation of the light are outputted as image data of one frame.

The synchronization unit 24 integrates (adds) sensor data outputted from the millimeter wave radar 22 within the exposure time period TE, for example, of the first line (first line from above) of one frame and outputs a result of the integration and frame image data, which have the first line exposed within the exposure time period TE within which the integration is performed, simultaneously with each other. Consequently, the image data as the sensor data outputted from the stereo camera 21 and the sensor data outputted from the millimeter wave radar 22 are synthesized with each other by the synchronization unit 24.

Figure 7:
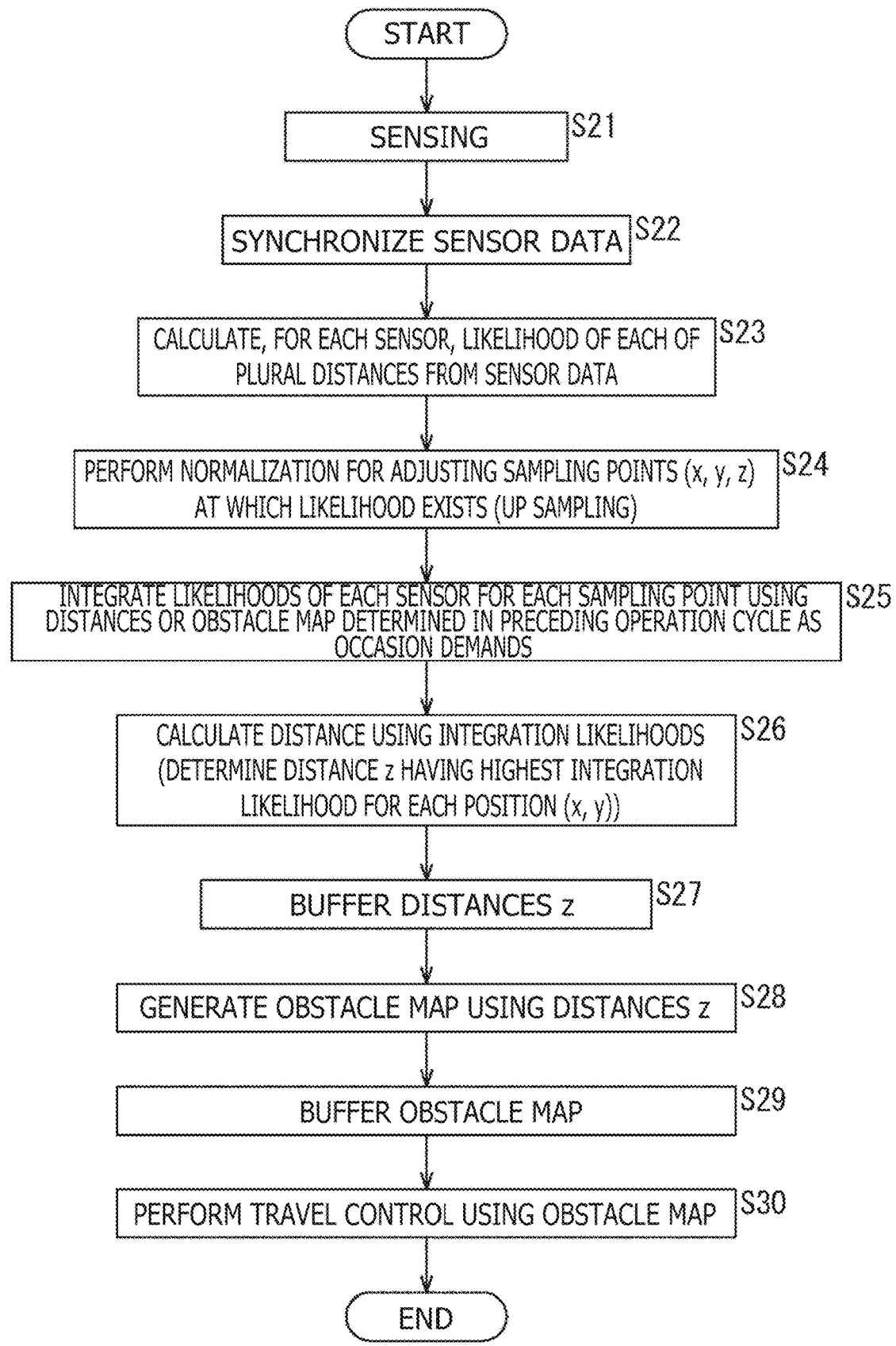
FIG. 7 is a flow chart illustrating an example of processing of the travel controlling apparatus.

FIG. 7 is a flow chart illustrating an example of processing of the travel controlling apparatus of FIG. 5.

At step S21, the stereo camera 21 and the millimeter wave radar 22 perform sensing.

In particular, at step S21, the stereo camera 21 picks up images from different points of view and outputs resulting image data as sensor data to the transmission unit 23.

Further, at step S21, the millimeter wave radar 22 transmits a millimeter wave, receives the millimeter wave reflected by and returning from an object and outputs the received millimeter wave as sensor data to the transmission unit 23.

The transmission unit 23 transmits the sensor data outputted from the stereo camera 21 and the millimeter wave radar 22 to the synchronization unit 24, and the processing advances from step S21 to step S22.

At step S22, the synchronization unit 24 synchronizes the sensor data of the stereo camera 21 and the millimeter wave radar 22 from the transmission unit 23 with each other, and outputs image data of one frame as the sensor data of the stereo camera 21 and the sensor data of the millimeter wave radar 22 corresponding to the image data of the one frame to the likelihood calculation unit 25. Thereafter, the processing advances to step S23.

At step S23, the likelihood calculation unit 25 calculates, from the sensor data of the stereo camera 21 from the synchronization unit 24, distance likelihoods according to the stereo camera 21 in regard to each sampling points (x, y, z) and supplies the calculated distance likelihoods to the normalization unit 26.

Further, the likelihood calculation unit 25 calculates, from the sensor data of the millimeter wave radar 22 from the synchronization unit 24, distance likelihoods according to the millimeter wave radar 22 in regard to each sampling point (x, y, z) and supplies the calculated distance likelihoods to the normalization unit 26.

Then, the processing advances from step S23 to step S24, at which the normalization unit 26 performs normalization for making the sampling pints (x, y, z) coincide with each other in regard to the distance likelihoods of the sampling points (x, y, z) according to the stereo camera 21 and the distance likelihoods of the sampling points according to the millimeter wave radar 22 from the likelihood calculation unit 25.

The normalization unit 26 supplies the distance likelihoods of the sampling points (x, y, z) according to the stereo camera 21 and the distance likelihoods of the sampling points (x, y, z) according to the millimeter wave radar 22 after the normalization to the integration unit 27, and the processing advances from step S24 to step S25.

At step S25, the integration unit 27 integrates the luminance likelihoods according to the stereo camera 21 and the distance likelihoods according to the millimeter wave radar 22 from the normalization unit 26 for the individual sampling points (x, y, z).

Then, the integration unit 27 supplies the integration likelihoods for the individual sampling points (x, y, z) obtained as a result of the integration to the distance calculation unit 28, and the processing advances from step S25 to step S26.

It is to be noted that, as described with reference to FIG. 5, the integration unit 27 can perform integration of the distance likelihoods according to the stereo camera 21 and the distance likelihoods according to the millimeter wave radar 22 using the distances z and the obstacle map determined in the preceding operation cycle and stored in the buffer 31 as occasion demands. Consequently, the load of the integration processing can be reduced.

At step S26, the distance calculation unit 28 uses the integration likelihood of distances for each sampling point (x, y, z) from the integration unit 27 to determine, for each position (x, y), a distance z whose integration likelihood of distances is in the maximum as a distance to an object reflected on a pixel at the position (x, y).

Then, the distance calculation unit 28 supplies the distance z for each position (x, y) to the obstacle map generation unit 29 and the buffer 31, and the processing advances form step S26 to step S27.

At step S27, the buffer 31 buffers (temporarily stores) the distances z for the individual positions (x, y) supplied from the distance calculation unit 28, and the processing advances to step S28.

Here, the distance z for each position (x, y) stored in the buffer 31 is used when the integration unit 27 performs next integration as occasion demands.

At step S28, the obstacle map generation unit 29 uses the distances z from the distance calculation unit 28 to generate an obstacle map as obstacle information regarding an obstacle existing in front of the automobile. Then, the obstacle map generation unit 29 supplies the obstacle map to the travel controlling unit 30 and the buffer 31, and the processing advances from step S28 to step S29.

At step S29, the buffer 31 buffers the obstacle map supplied from the obstacle map generation unit 29, and the processing advances to step S30.

Here, the obstacle map stored in the buffer 31 is used as occasion demands when the integration unit 27 performs next integration.

At step S30, the travel controlling unit 30 performs travel control of the automobile using the obstacle map from the obstacle map generation unit 29, and then the processing is ended.

It is to be noted that the processes according to the flow chart of FIG. 7 are performed repetitively in pipeline.

Figure 8:
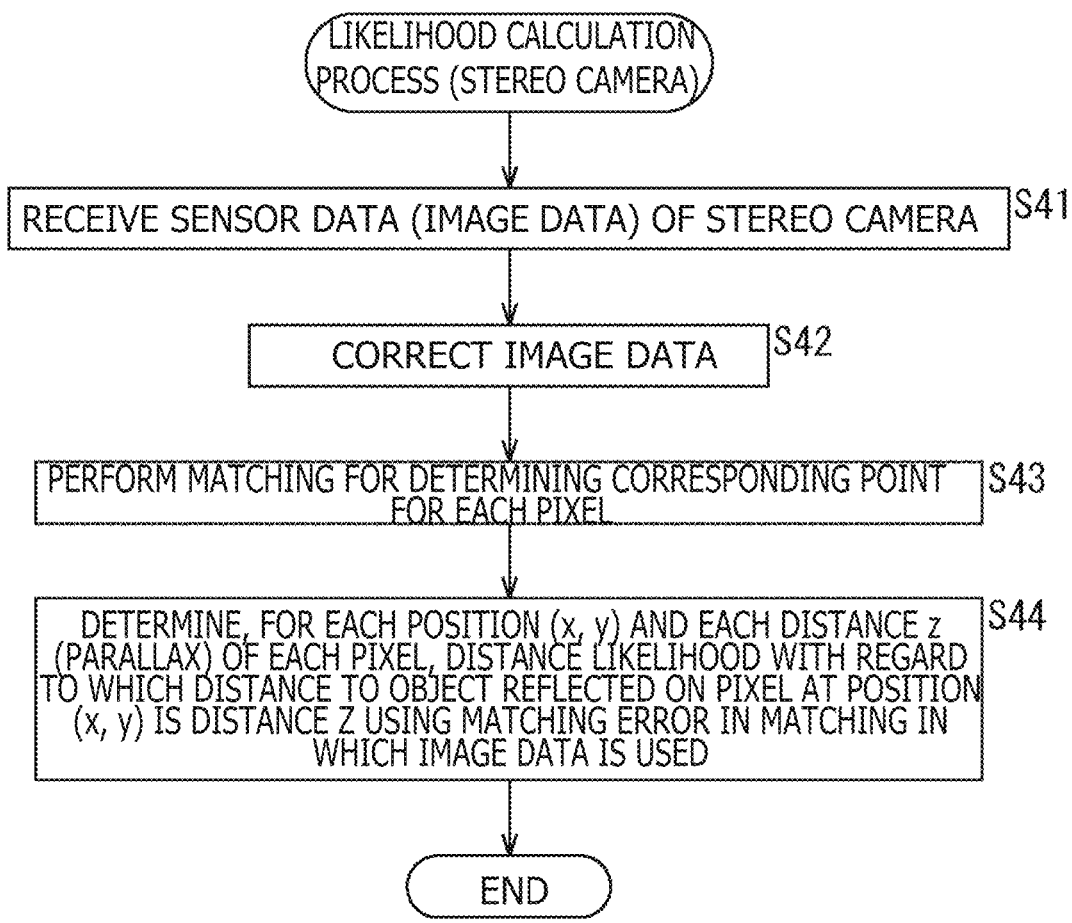
FIG. 8 is a flow chart illustrating an example of processing for determining a distance likelihood according to a stereo camera 21 from sensor data of the stereo camera 21.

FIG. 8 is a flow chart illustrating an example of processing for determining a distance likelihood according to the stereo camera 21 from sensor data of the stereo camera 21 at step S23 of FIG. 7.

At step S41, the likelihood calculation unit 25 receives (captures) image data as sensor data of the stereo camera 21 from the synchronization unit 24, and the processing advances to step S42.

At step S42, the likelihood calculation unit 25 performs correction of image data as sensor data of the stereo camera 21, and the processing advances to step S43.

Here, as the correction of image data at step S42, for example, correction of an aberration, correction of image data for matching the angle in the horizontal direction between the stereo camera 21 and the millimeter wave radar 22, and so forth are available.

Such correction of image data as to make the horizontal coincide between the stereo camera 21 and the millimeter wave radar 22 is performed using calibration information for correcting displacement in mounting position or posture between the stereo camera 21 and the millimeter wave radar 22.

The calibration information is determined in advance by calibration performed for the stereo camera 21 and the millimeter wave radar 22.

At step S43, the likelihood calculation unit 25 determines one and the other of two images of different points of view picked up by the camera 21L and the camera 21R, which are sensor data of the stereo camera 21, as a standard image and a reference image, and performs matching for determining points that correspond to pixels of the standard image and are pixels of the reference image corresponding to the pixels, for example, by block matching or the like.

In particular, the likelihood calculation unit 25 successively selects the pixels of the standard image as a noticed image and performs block matching between blocks of reference images centered at positions displaced individually by a plurality of parallaxes from the noticed pixel and blocks of the standard image centered at the noticed pixel.

Consequently, for each of a plurality of distances z individually corresponding to a plurality of parallaxes with respect to the noticed pixel, a matching error in block matching (for example, the difference absolute value sum or the like of pixel values of the pixels of the blocks of the standard image and the blocks of the reference image) is determined.

Thereafter, the processing advances from step S43 to step S44, at which the likelihood calculation unit 25 determines, from the positions (x, y) and the distances z (parallaxes) of the pixels of image data (here, the pixels of the standard image) as sensor data of the stereo camera 21, a distance likelihood that the distance to an object reflected at the position (x, y) is the distance z using the matching errors, and then the processing is ended.

Here, the matching error in block matching for the positions (x, y) and the distances z, namely, the matching error in block matching when it is assumed that the distance to an object reflected on a pixel at the position (x, y) is the distance z, is represented by cost(x, y, z).

In this case, a distance likelihood $P_{ST}(x, y, z)$ that the distance to an object reflected at the position (x, y) is the distance z can be determined, for example, in accordance with an expression $P_{ST}(x, y, z)=\exp(-\text{cost}(x, y, z))$.

Figure 9:
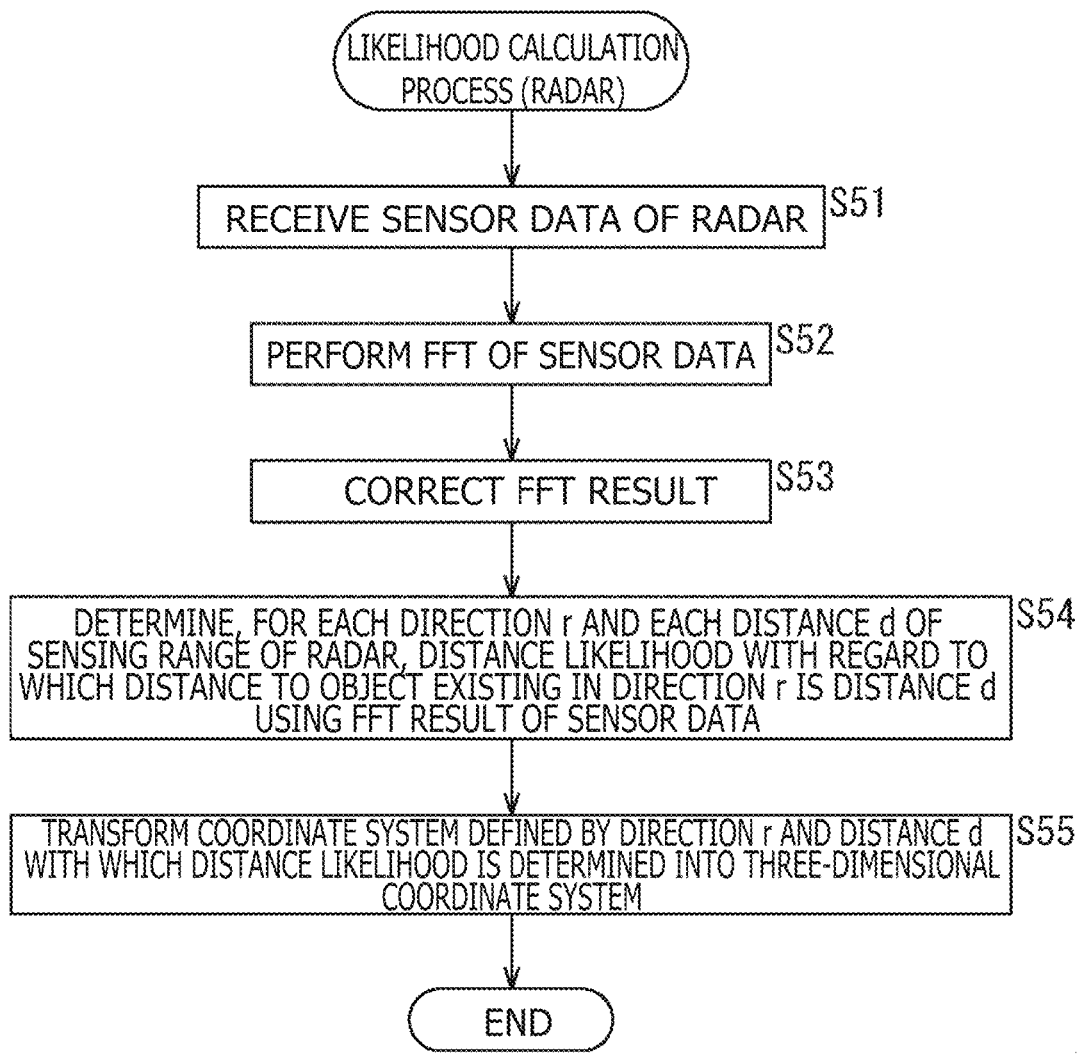
FIG. 9 is a flow chart illustrating an example of processing for determining a distance likelihood according to a millimeter wave radar 22 from sensor data of the millimeter wave radar 22.

FIG. 9 is a flow chart illustrating an example of processing for determining a distance likelihood according to the millimeter wave radar 22 from sensor data of the millimeter wave radar 22 at step S23 of FIG. 7.

At step S51, the likelihood calculation unit 25 receives (captures) sensor data of the millimeter wave radar 22 from the synchronization unit 24, and the processing advances to step S52.

At step S52, the likelihood calculation unit 25 performs FFT (Fast Fourier Transform) of the sensor data of the millimeter wave radar 22, and the processing advances to step S53.

Here, in the present embodiment, it is assumed that, in regard to the sensor data of the millimeter wave radar 22, the intensity of the FFT result of the sensor data represents the likelihood that an object will be at a distance corresponding to the frequency of the intensity.

At step S53, the likelihood calculation unit 25 performs correction of the FFT result of the sensor data of the millimeter wave radar 22, and the processing advances to step S54.

Here, the sensor data of the millimeter wave radar 22, namely, a millimeter wave reflected by the object, attenuates by an amount that increases as the distance to the object increases. Therefore, in order to cancel the influence of the attenuation, the likelihood calculation unit 25 performs correction for increasing a frequency component in a high frequency region of the FFT result of the sensor data of the millimeter wave radar 22.

Further, the likelihood calculation unit 25 performs correction of the FFT result of the sensor data of the millimeter wave radar 22 so as to cancel the displacement in mounting position and posture of the stereo camera 21 and the millimeter wave radar 22 using the calibration information described hereinabove with reference to FIG. 8.

At step S54, the likelihood calculation unit 25 determines, for each direction (orientation) r and each distance d of the sensing range of the millimeter wave radar 22, a distance likelihood of the distance d when it is assumed that the distance to an object located in the direction r is the distance d from the FFT result of the sensor data of the millimeter wave radar 22.

Here, if (the frequency component of) the FFT result of the sensor data of the millimeter wave radar 22 corresponding to the orientation r and the distance d is represented by fre(r, d), then the distance likelihood $P_R$ that the distance to the object in the orientation r is the distance d can be determined, for example, in accordance with an expression $P_R$=fre(r, d)/$\Sigma_{(d)}$fre(r, d).

$\Sigma_{(d)}$fre(r, d) of the expression $P_R$=fre(r, d)/$\Sigma_{(d)}$fre(r, d) represents summation of fre(r, d) when the distance d is changed to each distance for which a distance likelihood is to be determined.

Thereafter, the processing advances from step S54 to step S55, at which the likelihood calculation unit 25 transforms each direction r and each distance d of the polar coordinate system (defined a direction and a distance) for which a distance likelihood according to the millimeter wave radar 22 is obtained, into a position (x, y, z) of the three-dimensional coordinate system by coordinate transformation to determine a distance likelihood for each sampling point (x, y, z) that is a position (x, y, z) in the three-dimensional coordinate system. Then, the processing is ended.

Here, the coordinate transformation at step S55 can be performed using the calibration information described hereinabove with reference to FIG. 8 as occasion demands.

It is to be noted that generation of a distance likelihood from sensor data of the stereo camera 21, millimeter wave radar 22 or like can be performed otherwise, for example, in accordance with a transformation rule for transforming sensor data into a distance likelihood, which is designed in advance on the basis of an empirical rule.

Further, the generation of a distance likelihood from sensor data can be performed by performing learning of a learning model for outputting a distance likelihood in advance using sensor data as an input and providing sensor data as an input to the learning model.

The foregoing similarly applies also to the movement amount likelihood.

Further, after the distance likelihoods according to the stereo camera 21 and the distance likelihoods according to the millimeter wave radar 22 are integrated for each sampling point (x, y, z) at step S25 of FIG. 7, optimization of the integration likelihoods can be performed before the distance to the object reflected on the pixel at the position (x, y) using the integration likelihoods at step S26.

In particular, although, at step S26, the distance z whose integration likelihood of distances is in the maximum is determined, for each position (x, y), as the distance to the object reflected on the pixel at the position (x, y), the integration likelihood of the position (x, y) is sometimes low over all distances z, and in this case, any distance z is not likely as the distance to the object.

Therefore, in the optimization of the integration likelihoods, when the integration likelihood of the position (x, y) is low over all distances z, the integration likelihood of the position (x, y) is corrected in order that the distance, determined from an integration likelihood of a position (x', y') around the position (x, y), in the proximity of the distance to the object reflected on the pixel at the position (x', y') can be determined readily as a distance to the object reflected on the pixel at the position (x, y).

In particular, the distance likelihood according to the stereo camera 21 and the distance likelihood according to the millimeter wave radar 22 at the sampling point (x, y, z) are represented by p1(x, y, z) and p2(x, y, z), respectively.

Further, the likelihood that the distance of the position (x, y) is the distance z when the distance of a position (x', y') around a certain position (x, y) (distance to the object reflected on a pixel at the position (x', y')) is a distance z' is represented by p(x, y, z|z').

The likelihood p(x, y, z|z') is determined in advance, for example, on the basis of learning, an empirical rule or the like.

The optimization of the integration likelihood is performed, where the integration likelihood after the optimization is represented by pa(x, y, z), in accordance with an expression pa(x, y, z)=P1(x, y, z)×P2(x, y, z)×$\Pi_{(x', y')}$p(x, y, z|z').

Here, P1(x, y, z)×P2(x, y, z) in the expression pa(x, y, z)=P1(x, y, z)×P2(x, y, z)×$\Pi_{(x', y')}$p(x, y, z|z') represents the integration likelihood of the sampling point (x, y, z). Further, $\Pi_{(x', y')}$p(x, y, z|z') represents the product of the likelihood p(x, y, z|z') where the position (x', y') is changed to a position around the position (x, y).

Figure 10:
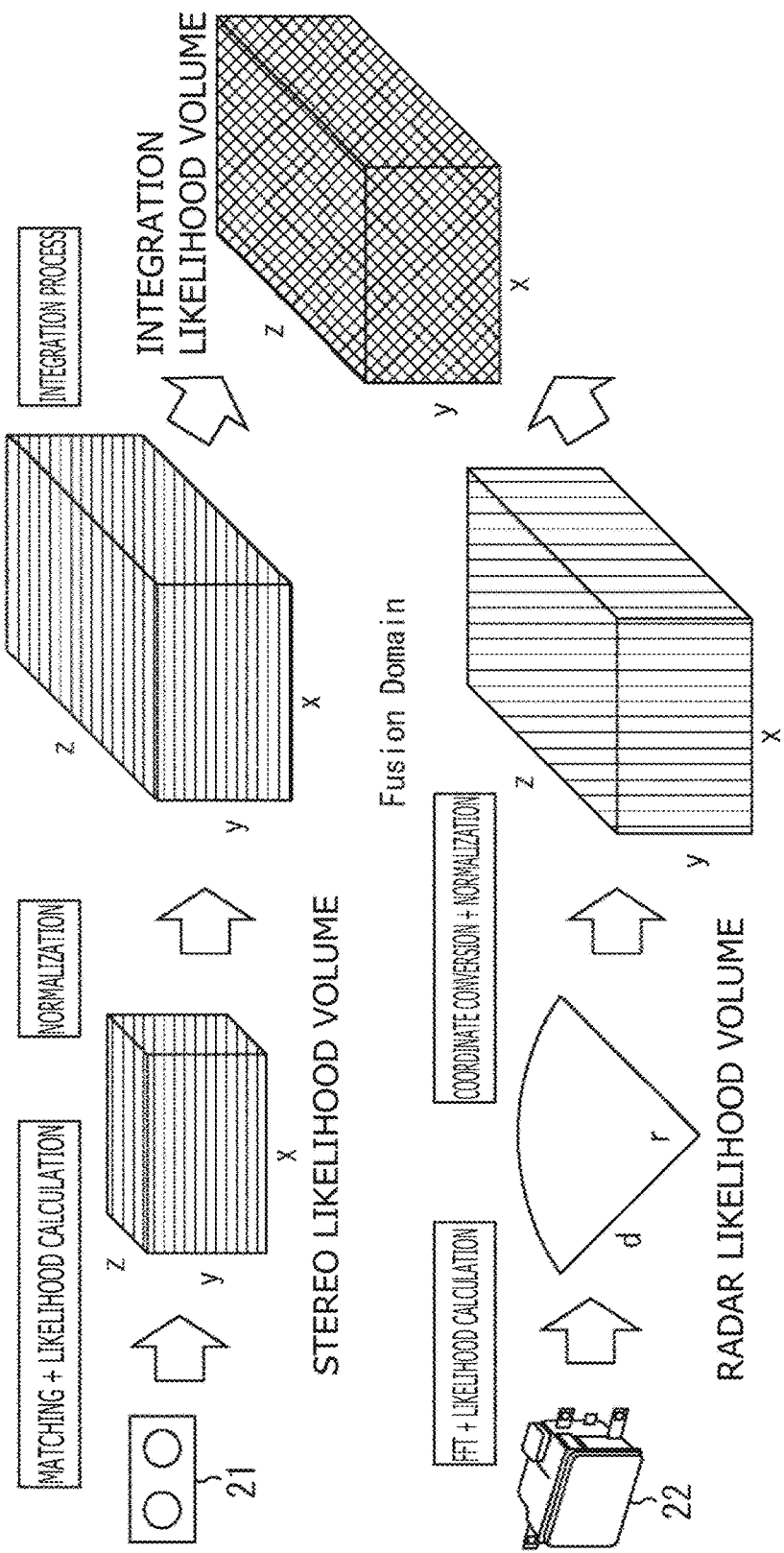
FIG. 10 is a view illustrating an outline of an integration method.

FIG. 10 is a view illustrating an outline of the integration method.

In the integration method, the distance likelihood that, for each position (x, y) and each distance z of each pixel of image data as sensor data of the stereo camera 21, the distance to the object reflected at the position (x, y) is the distance z, is determined as a distance likelihood according to the stereo camera 21.

Accordingly, a distance likelihood according to the stereo camera 21 exists at each sampling point (x, y, z) that is a position (x, y, z) of the three-dimensional coordinate system. A set of distance likelihoods according to the stereo camera 21 existing at each position (x, y, z) of the three-dimensional coordinate system is hereinafter referred to as stereo likelihood volume.

Further, in the integration method, for each direction r and each distance d within the sensing range of the millimeter wave radar 22, a distance likelihood that the distance to an object existing in the direction r is the distance d is determined.

The set of distance likelihoods determined for each direction r and each distance d is a set of points on the polar coordinate system defined by the direction r and the distance d and is hereinafter referred to also as radar likelihood volume.

In the integration method, a stereo likelihood volume is normalized.

Further, in the integration method, a radar likelihood volume of a polar coordinate system is coordinate-transformed into a set of points of the three-dimensional coordinate defined by the positions (x, y, z) and is normalized further.

In the stereo likelihood volume and the radar likelihood volume after the coordinate transformation, sampling points (x, y, z) at which a distance likelihood exists after the normalization coincide with each other.

Now, a region in which, when sampling points (x, y, z) at which a distance likelihood exists in the stereo likelihood volume and the radar likelihood volume after the coordinate transformation coincide with each other in this manner, a region in which the sampling points (x, y, z) exist is referred to as fusion domain.

Since, in the fusion domain, the sampling points (x, y, z) at which a distance likelihood according to the stereo camera 21 and a distance likelihood according to the millimeter wave radar 22 exist coincide with each other, the distance likelihood according to the stereo camera 21 and the distance likelihood according to the millimeter wave radar 22 can be integrated for each sampling point (x, y, z).

Therefore, in the integration method, a distance likelihood according to the stereo camera 21 and a distance likelihood according to the millimeter wave radar 22 are integrated for each sampling point (x, y, z), and the distance to the object reflected on the pixel at each position (x, y, z) is determined using the integration likelihood obtained for each sampling point (x, y, z).

Here, a set of integration likelihoods of each sampling point (x, y, z) in the fusion domain is referred to also as integration likelihood volume.

Figure 11:
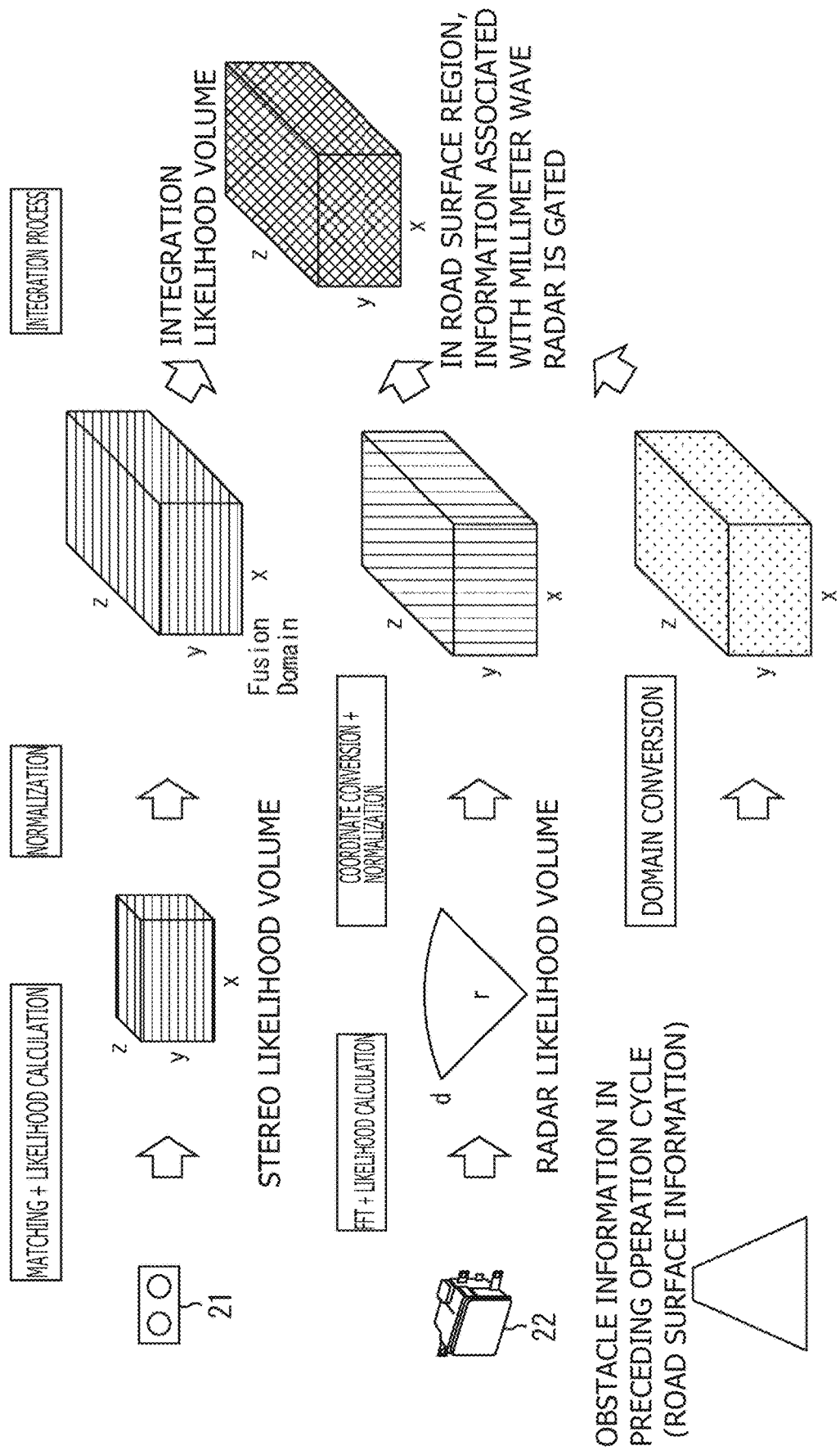
FIG. 11 is a view illustrating an outline of a reduction process for reducing the load of processing for integration.

FIG. 11 is a view illustrating an outline of a reduction process for reducing the load of the integration processing in integration by the integration unit 27 of FIG. 5.

As described hereinabove with reference to FIG. 5 or 7, the integration unit 27 can perform, upon integration, a reduction process for reducing the load of the integration process by using the distance z for each position (x, y) or an obstacle map determined in the preceding operation cycle.

For example, the integration unit 27 recognizes a road surface in regard to which the detection accuracy of the distance by the millimeter wave radar 22 is not high from an obstacle map as obstacle information determined in the preceding operation cycle. Further, the integration unit 27 performs domain transformation for transforming a point in a region of the road surface into a sampling point (x, y, z) of the fusion domain.

Then, when distance likelihoods according to the stereo camera 21 and distance likelihoods according to the millimeter wave radar 22 are integrated for each sampling point (x, y, z) as described hereinabove with reference to FIG. 10, the integration unit 27 gates the distance likelihoods according to the millimeter wave radar 22 in regard to the sampling points (x, y, z) in the region of the road surface.

In particular, the integration unit 27 integrates, in regard to the sampling points (x, y, z) other than the sampling points (x, y, z) in the region of the road surface, the distance likelihoods according to the stereo camera 21 and the distance likelihoods according to the millimeter wave radar 22 to determine an integration likelihood.

On the other hand, in regard to the sampling points in the region of the road surface, the integration unit 27 excludes the distance likelihoods according to the millimeter wave radar 22 from the target of the integration. As a result, in regard to the sampling points in the region of the road surface, the distance likelihoods according to the stereo camera 21 are used as they are as integration likelihoods.

As regards the road surface, since the detection accuracy of the distance according to the millimeter wave radar 22 is not high, in a case where an integration likelihood is to be determined, even if the distance likelihoods according to the millimeter wave radar 22 are excluded (not excluded) from the target of integration, this does not have (little has) an influence on the accuracy of the distance determined from the integration likelihoods.

Accordingly, by performing a reduction process for excluding the distance likelihoods according to the millimeter wave radar 22 regarding the road surface from the target of integration, it is possible to determine the distance to the object with high accuracy and to reduce the load of the integration processing.

Figure 12:
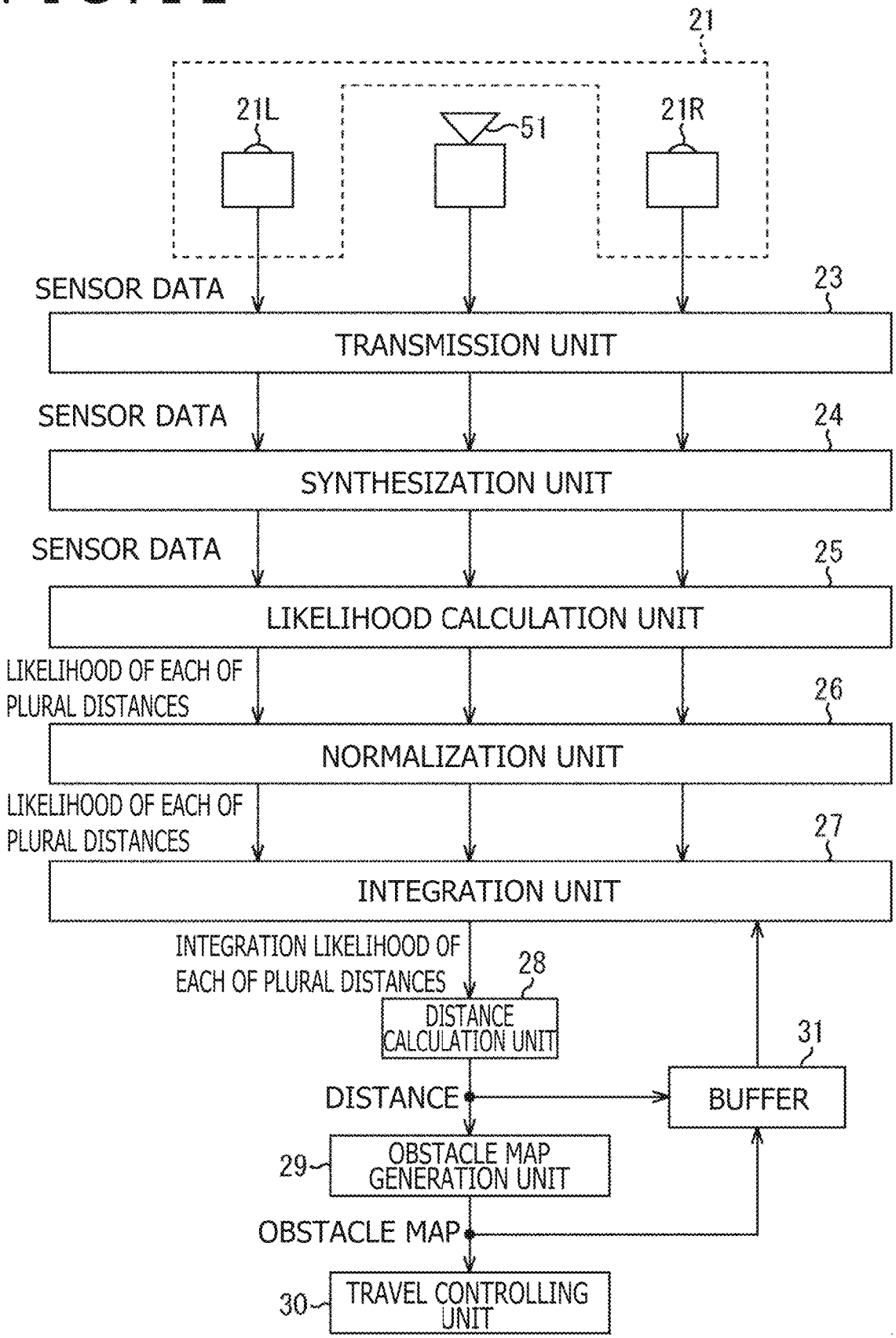
FIG. 12 is a block diagram depicting a second detailed configuration example of the travel controlling apparatus to which the present technology is applied.

Second Detailed Configuration Example of Travel Controlling Apparatus to which Present Technology is Applied FIG. 12 is a block diagram depicting a second detailed configuration example of the travel controlling apparatus to which the present technology is applied.

It is to be noted that, in FIG. 12, corresponding portions to those in the case of FIG. 5 are denoted by like reference characters, and description of them is omitted suitably in the following description.

In FIG. 12, the travel controlling apparatus includes a stereo camera 21, a transmission unit 23, a synchronization unit 24, a likelihood calculation unit 25, a normalization unit 26, an integration unit 27, a distance calculation unit 28, an obstacle map generation unit 29, a travel controlling unit 30, a buffer 31 and a ToF sensor 51.

Accordingly, the travel controlling apparatus of FIG. 12 is common to that of FIG. 5 in that it includes the stereo camera 21 and the components from the transmission unit 23 to the buffer 31.

However, the travel controlling apparatus of FIG. 12 is different from that of FIG. 5 in that it includes the ToF sensor 51 in place of the millimeter wave radar 22.

Accordingly, in the travel controlling apparatus of FIG. 12, processing similar to that described hereinabove with reference to FIG. 7 except that sensor data of the ToF sensor 51 is used in place of sensor data of the millimeter wave radar 22 is performed.

Figure 13:
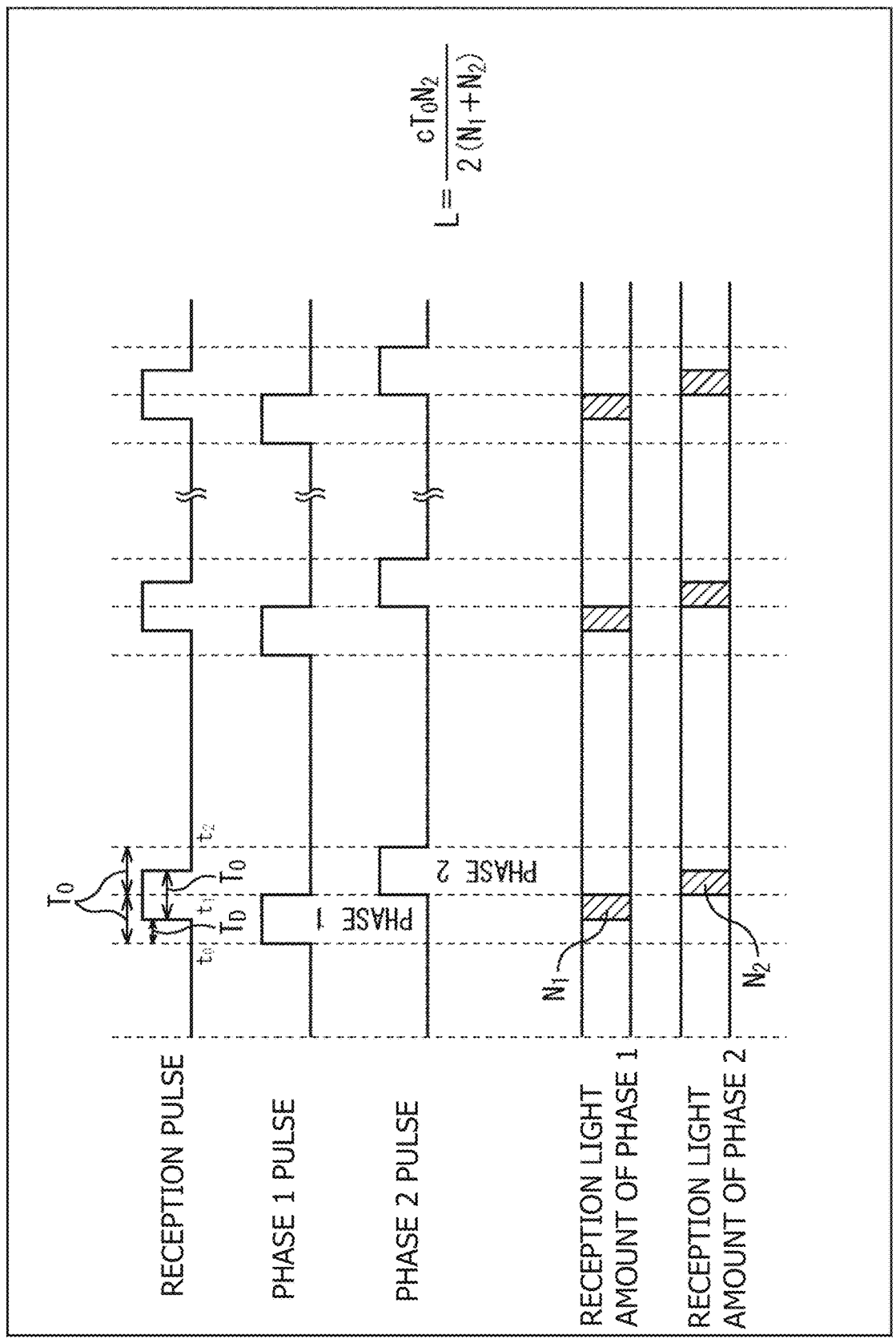
FIG. 13 is a view illustrating an example of a calculation method of a distance likelihood according to a ToF sensor 51.

FIG. 13 is a view illustrating an example of a calculation method of a distance likelihood according to the ToF sensor 51 of FIG. 12.

The ToF sensor 51 has light reception units (not depicted) arranged, for example, in a matrix of length×width of 80×60 or the like, and irradiates transmission pulses at a high speed and receives reflected light of the transmission pulses reflected by and returning from an object as reception pulses to detect the distance to the object.

In particular, in a case where a reception pulse is received after lapse of a time period $T_D$ from transmission time $t_0$ of a transmission pulse as depicted in FIG. 13, time at which a pulse width $T_0$ of the reception pulse elapses from time $t_0$ is represented as $t_1$ and time at which the pulse width $T_0$ elapses further from time $t_1$ is represented as $t_2$.

Further, a pulse that exhibits the H (High) level for a period from time $t_0$ to time $t_1$ is referred to as phase 1 pulse, and a pulse that exhibits the H level for a period from time $t_1$ to time $t_2$ is referred to as phase 2 pulse.

Furthermore, the light reception amount (charge amount) within a period of the phase 1 pulse (period from time $t_0$ to time $t_1$) when a reception pulse is received by a light reception unit of the ToF sensor 51 is represented as $N_1$, and the light reception amount within a period of the phase 2 pulse (period from time $t_1$ to time $t_2$) is represented as $N_2$.

In the ToF sensor 51, a large number of transmission pulses are sent within a period of a time frame T as a predetermined time period T, and reception pulses corresponding to the transmission pulses are received by the light reception unit.

Then, in the ToF sensor 51, the distance L is determined from each reception pulse in accordance with an expression $L=cT_0N_2/(2(N_1+N_2))$. Here, c represents the speed of light.

The ToF sensor 51 outputs a plurality of (a large number of) distances L determined in such a manner as described above from the reception pulses corresponding to the large number of transmission pulses transmitted with the period of the time frame T as sensor data.

Then, the likelihood calculation unit 25 of FIG. 12 determines, on the basis of the distribution of the plurality of distances that are sensor data of the ToF sensor 51 in the time frame T, distance likelihoods with regard to which the distance to the position (x, y) of each light reception unit of the ToF sensor 51, namely, the distance to the object by which a transmission pulse corresponding to a reception pulse received by the light reception unit at the position (x, y) is reflected, is each of the plurality of distances z.

The likelihood calculation unit 25 determines, from sensor data of the ToF sensor 51 in such a manner as described above, distance likelihoods where each position (x, y, z) of the three-dimensional coordinate system represented by a position (x, y) and a distance z of a light reception unit of the ToF sensor 51 is a sampling point.

Figure 14:
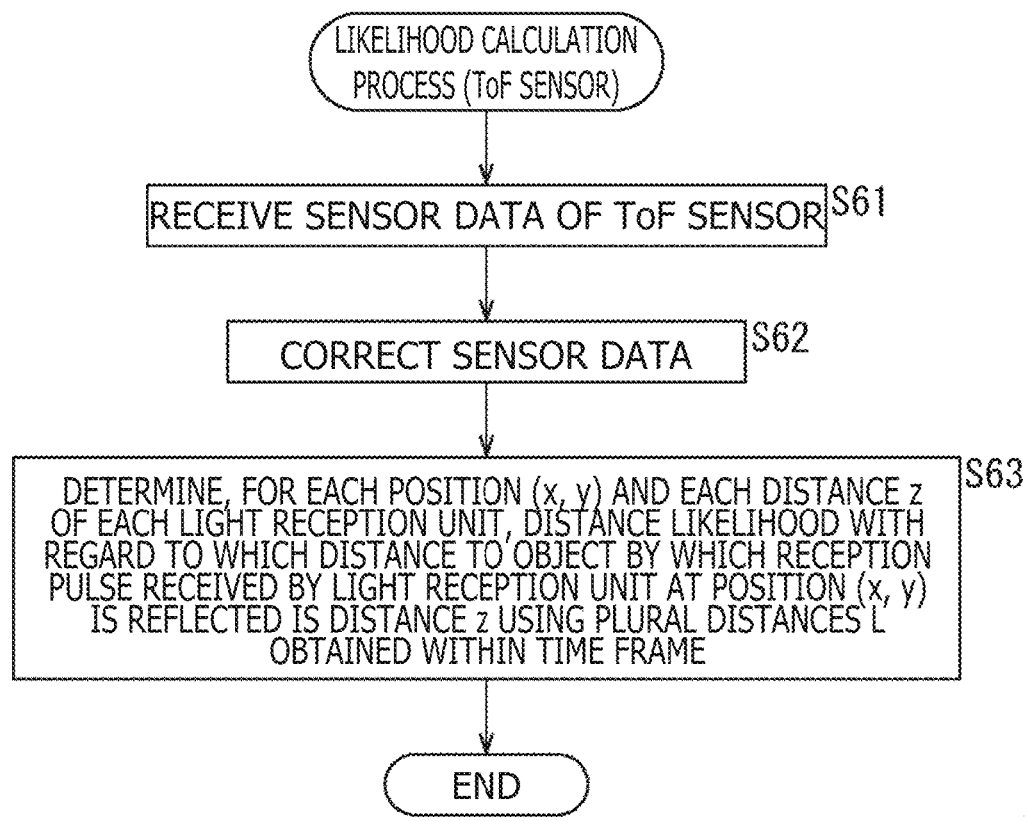
FIG. 14 is a flow chart illustrating an example of processing for determining a distance likelihood regarding the ToF sensor 51 from sensor data of the ToF 51.

FIG. 14 is a flow chart illustrating an example of processing for determining a distance likelihood according to the ToF sensor 51 from sensor data of the ToF sensor 51 of FIG. 12.

At step S61, the likelihood calculation unit 25 of FIG. 12 receives (captures) a plurality of, M2, distances L within a period of a time frame T obtained from a plurality of, M1, light reception units of the ToF sensor 51 as sensor data of the ToF sensor 51 supplied from the synchronization unit 24, and the processing advances to step S62.

At step S62, the likelihood calculation unit 25 corrects the M2 distances L as sensor data of the ToF sensor 51 as occasion demands, and the processing advances to step S63.

Here, as the correction of the sensor data of the ToF sensor 51 at step S62, for example, correction for canceling displacement in mounting position or posture of the stereo camera 21 and the ToF sensor 51 is available. This correction can be performed using calibration information determined in advance by calibration performed for the stereo camera 21 and the ToF sensor 51.

At step S63, the likelihood calculation unit 25 determines, in regard to each position (x, y) of each of the M1 reception units and each distance z in the sensing range of the ToF sensor 51, a distance likelihood with regard to which the distance to an obstacle by which a reception pulse received by the light reception unit at the position (x, y) is the distance z using the M2 distances L obtained within the period of the time frame T as sensor data of the ToF sensor 51.

Here, the likelihood calculation unit 25 determines a distance likelihood with regard to which the distance to an object is each of the plurality of distances z, for example, on the basis of the distribution of the M2 distances L obtained within the period of the time frame T.

In particular, the likelihood calculation unit 25 determines, for example, an average value and a variance of the M2 distances L and determines a Gaussian distribution defined by the average values and the variances. Then, the likelihood calculation unit 25 determines, for each of the distances z, a value according to the Gaussian distribution defined by the average value and the variance of the M2 distances L as a distance likelihood.

Also, the likelihood calculation unit 25 determines, for example, a frequency distribution of the M2 distances L and determines, for each distance z, a value corresponding to the frequency of the frequency distribution as a distance likelihood.

Figure 15:
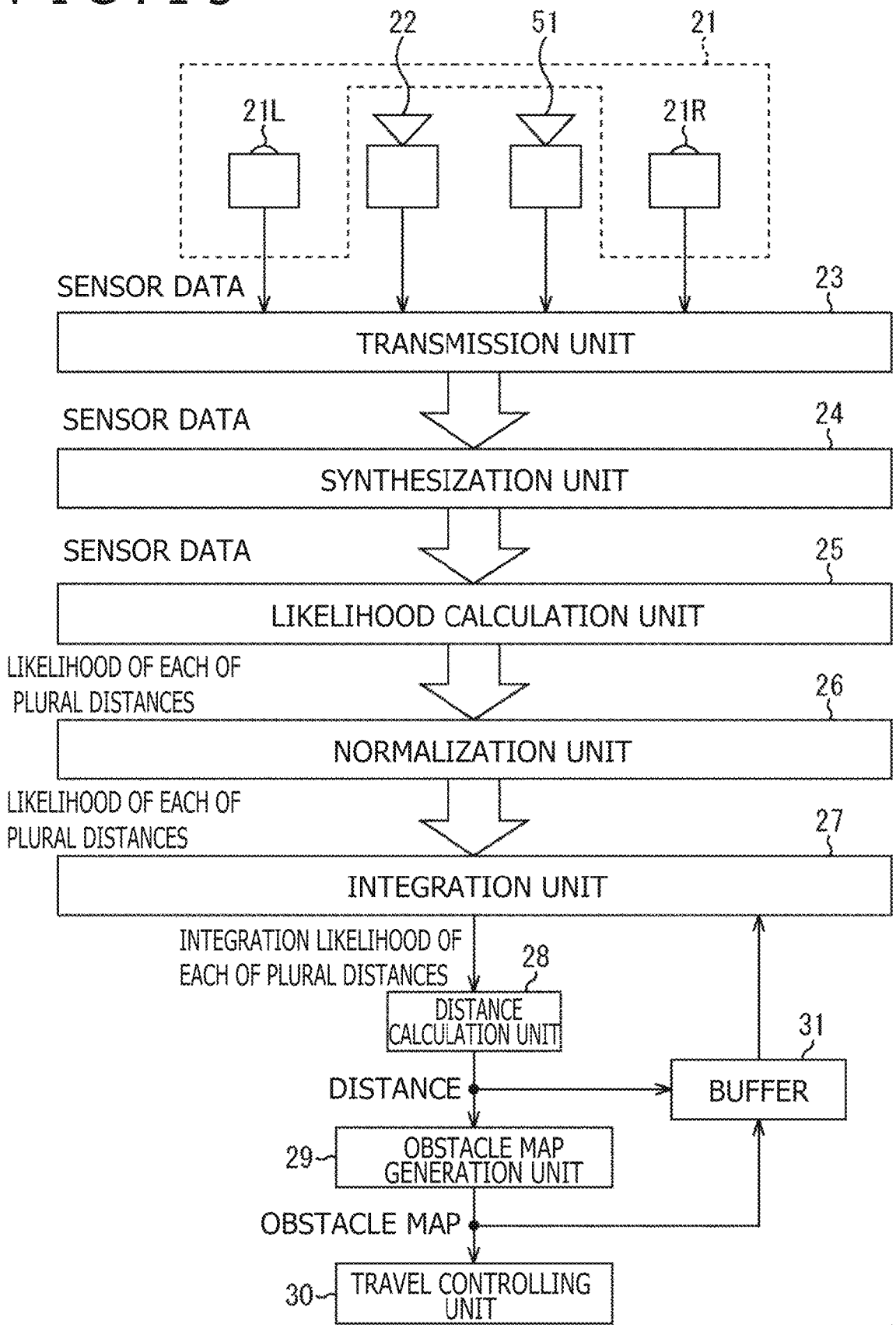
FIG. 15 is a block diagram depicting a third detailed configuration example of the travel controlling apparatus to which the present technology is applied.

Third Detailed Configuration Example of Travel Controlling Apparatus to which Present Technology is Applied FIG. 15 is a block diagram depicting a third detailed configuration example of the travel controlling apparatus to which the present technology is applied.

It is to be noted that, in FIG. 15, corresponding portions to those of FIG. 5 or 12 are denoted by like reference characters, and description of them is omitted suitably in the following description.

In FIG. 15, the travel controlling apparatus includes a stereo camera 21, a millimeter wave radar 22, a transmission unit 23, a synchronization unit 24, a likelihood calculation unit 25, a normalization unit 26, an integration unit 27, a distance calculation unit 28, an obstacle map generation unit 29, a travel controlling unit 30, a buffer 31 and a ToF sensor 51.

Accordingly, the travel controlling apparatus of FIG. 15 is common to that of FIG. 5 in that it includes the components from the stereo camera 21 to the buffer 31.

However, the travel controlling apparatus of FIG. 15 is different from that of FIG. 5 in that the ToF sensor 51 of FIG. 12 is provided newly.

In the travel controlling apparatus of FIG. 15, processing similar to that described hereinabove with reference to FIG. 7 is performed except that sensor data of the ToF sensor 51 is used in addition to sensor data of the stereo camera 21 and sensor data of the millimeter wave radar 22.

Accordingly, in the travel controlling apparatus of FIG. 15, in addition to distance likelihoods according to the stereo camera 21 and distance likelihoods according to the millimeter wave radar 22, distance likelihoods according to the ToF sensor 51 are integrated to determine an integration likelihood.

Figure 16:
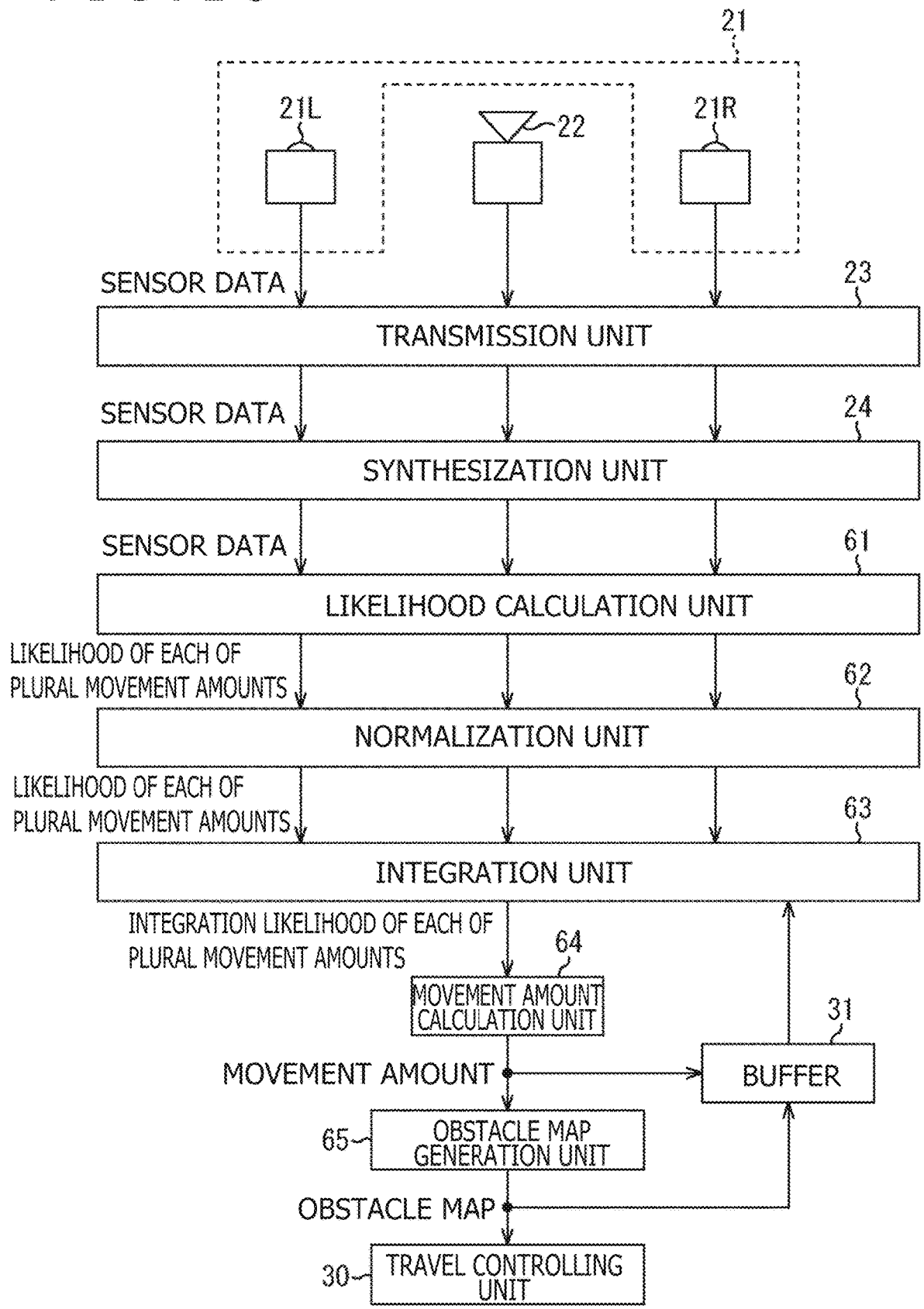
FIG. 16 is a block diagram depicting a fourth detailed configuration example of the travel controlling apparatus to which the present technology is applied.

Fourth Detailed Configuration Example of Travel Controlling Apparatus to which Present Technology is Applied FIG. 16 is a block diagram depicting a fourth detailed configuration example of the travel controlling apparatus to which the present technology is applied.

It is to be noted that, in FIG. 16, corresponding portions to those in the case of FIG. 5 are denoted by like reference characters, and description of them is omitted suitably in the following description.

In FIG. 16, the travel controlling apparatus includes a stereo camera 21, a millimeter wave radar 22, a transmission unit 23, a synchronization unit 24, a travel controlling unit 30, a buffer 31, a likelihood calculation unit 61, a normalization unit 62, an integration unit 63, a movement amount calculation unit 64 and an obstacle map generation unit 65.

Accordingly, the travel controlling apparatus of FIG. 16 is common to that of FIG. 5 in that it includes the stereo camera 21, millimeter wave radar 22, transmission unit 23, synchronization unit 24, travel controlling unit 30 and buffer 31.

However, the travel controlling apparatus of FIG. 16 is different from that of FIG. 5 in that the likelihood calculation unit 61, normalization unit 62, integration unit 63, movement amount calculation unit 64 and obstacle map generation unit 65 are provided in place of the likelihood calculation unit 25, normalization unit 26, integration unit 27, distance calculation unit 28 and obstacle map generation unit 29.

The likelihood calculation unit 61 corresponds to the likelihood calculation unit 12 of FIG. 1.

The likelihood calculation unit 61 calculates movement amount likelihoods according to the stereo camera 21 from sensor data of the stereo camera 21 from the synchronization unit 24 for each of sampling points (x, y, z, vx, vy, vz), namely, for each position (x, y) of each pixel of image data as sensor data of the stereo camera 21, a distance z to an object reflected at the position and each movement amount (vx, vy, vz) within a range of a movement that can be detected by movement detection performed using an image as the sensor data of the stereo camera 21 (a relative movement amount with reference to the automobile in which the travel controlling apparatus is incorporated), and supplies the movement amount likelihoods to the normalization unit 62.

Here, in regard to a movement amount likelihood, a sampling point (x, y, z, vx, vy, vz) is a point on a six-dimensional (orthogonal) coordinate system having axes of x, y, z, vx, vy and vz as described hereinabove with reference to FIG. 2.

The likelihood calculation unit 61 further calculates movement amount likelihoods according to the millimeter wave radar 22 from sensor data of the millimeter wave radar 22 from the synchronization unit 24 for each sampling point (x, y, z, vx, vy, vz) and supplies the movement amount likelihoods to the normalization unit 62.

In particular, the likelihood calculation unit 61 determines, from the sensor data of the millimeter wave radar 22 from the synchronization unit 24, a movement amount likelihood of each distance when it is assumed that the movement amount of the position (r, d) on a polar coordinate system at each distance d in each direction (orientation) r is a movement amount within a range of the movement amount that can be detected by the millimeter wave radar 22.

Then, the likelihood calculation unit 61 transforms each position (r, d) and each movement amount in the polar coordinate system from which a movement amount likelihood according to the millimeter wave radar 22 is obtained into each position (x, y, z, vx, vy, vz) in the six-dimensional coordinate system by coordinate transformation, and supplies the movement amount likelihood of each sampling point (x, y, z, vx, vy, vz) that is a position (x, y, z, vx, vy, vz) in the six-dimensional coordinate system to the normalization unit 62.

The normalization unit 62 corresponds to the normalization unit 13 of FIG. 1.

The normalization unit 62 performs normalization for making the sampling points (x, y, z, vx, vy, vz) from the likelihood calculation unit 61, coincide between the movement amount likelihoods of the sampling points (x, y, z vx, vy, vz) according to the stereo camera 21 and the movement amount likelihoods of the sampling points (x, y, z vx, vy, vz) according to the millimeter wave radar 22 by interpolation or the like, and supplies the normalized sampling points (x, y, z, vx, vy, vz) to the integration unit 63.

The integration unit 63 corresponds to the integration unit 14 of FIG. 1.

The integration unit 63 integrates the movement amount likelihoods according to the stereo camera 21 from the normalization unit 62 and the movement amount likelihoods according to the millimeter wave radar 22 for each sampling point (x, y, z, vx, vy, vz) and supplies the integrated movement amount likelihoods to the movement amount calculation unit 64.

It is to be noted that the integration unit 63 can perform integration of the movement amount likelihoods according to the stereo camera 21 and the movement amount likelihoods according to the millimeter wave radar 22 using information stored in the buffer 31 as occasion demands.

In particular, in FIG. 16, movement amounts calculated by the movement amount calculation unit 64 hereinafter described and an obstacle map generated by the obstacle map generation unit 65 hereinafter described are stored into the buffer 31.

The integration unit 63 can reduce the load of the integration processing by performing integration of the movement amount likelihoods according to the stereo camera 21 and the movement amount likelihoods according to the millimeter wave radar 22 using the movement amounts determined in the preceding operation cycle or the obstacle map stored in the buffer 31.

In particular, for example, the integration unit 63 detects a moving object using the movement amount and the obstacle map determined in the preceding operation cycle and stored in the buffer 31 and specifies the position (x, y, z) within a range of the moving object (within a range surrounding the moving object with a predetermined margin). Then, the integration unit 63 performs integration of movement amount likelihoods only in regard to sampling points (x, y, z, vx, vy, vz) including positions (x, y, z) within the range of the moving object. Further, in regard to the other sampling points (x, y, z, vx, vy, vz), the integration unit 63 determines ones of the movement amount likelihoods according to the stereo camera 21 and the movement amount likelihoods according to the millimeter wave radar 22 as they are as integration likelihoods.

Here, the moving object not only can be detected from the movement amounts or using the obstacle map stored in the buffer 31 but also can be detected from sensor data of the millimeter wave radar 22.

For example, where sensor data of the millimeter wave radar 22 are sensor data from which a movement amount of an object can be determined by performing FFT in twice, it is possible to determine a movement amount of an object (for example, a movement amount in the z direction) from results of FFT of sensor data of the millimeter wave radar 22 performed twice and detect the moving object on the basis of the movement mount.

It is to be noted that the integration unit 63 performs, after it integrates movement amount likelihoods according to the stereo camera 21 and movement amount likelihoods according to the millimeter wave radar 22, optimization of the integration likelihoods similarly to the integration unit 27 of FIG. 5.

The movement amount calculation unit 64 corresponds to the distance/movement amount calculation unit 15 of FIG. 1.

The movement amount calculation unit 64 determines a movement amount of an object using integration likelihoods of movement amounts for each sampling point (x, y, z, vx, vy, vz) from the integration unit 63. In other words, the movement amount calculation unit 64 determines, for each position (x, y, z), a movement amount (vx, vy, vz) in regard to which the integration likelihood of the movement amount is in the maximum as a movement amount of the position (x, y, z).

Then, the movement amount calculation unit 64 supplies the movement amount (vx, vy, vz) determined using the integration likelihoods of movement amounts to the buffer 31 and the obstacle map generation unit 65.

It is to be noted that the movement amount calculation unit 64 can further determine, for example, for each position (x, y), a movement amount (vx, vy, vz) and a distance z in regard to which the integration likelihood of the movement amount is in the maximum as a movement amount of an object reflected on a pixel of the position (x, y) and a distance to the object.

The obstacle map generation unit 65 generates an obstacle map as obstacle information regarding an obstacle existing in front of the automobile using the movement amounts (vx, vy, vz) from the movement amount calculation unit 64. Then, the obstacle map generation unit 65 supplies the obstacle map to the travel controlling unit 30 and the buffer 31.

Here, where a movement amount is to be determined, as one of the plurality of sensors $11_1$ to $11_N$ of FIG. 1, a sensor for detecting the movement amount using an image, namely, an image sensor that picks up an image, is essentially required.

As the image sensor, not only the stereo camera 21 depicted in FIG. 16 can be adopted, but also a so-called single-eye camera like the camera 21L or 21R that configures the stereo camera 21.

Where a single-eye camera is adopted as the image sensor, in a case where the automobile in which the travel controlling apparatus is incorporated is moving (traveling), the position in the z direction (distance z) can be determined similarly as in the case in which a distance (parallax) is determined from images picked up by the stereo camera 21 using images picked up at timings (positions) different from each other such as, for example, images of two successive frames.

It is to be noted that, where a single-eye camera is adopted as the image sensor, in a case where the automobile in which the travel controlling apparatus is incorporated is in a stopping state, the position in the z direction (distance z) cannot be determined. In this case, as regards the position in the z direction, for example, a same movement amount likelihood (movement amount likelihood with the position in the z direction is ignored) can be adopted.

On the other hand, where a single-eye camera is adopted as the image sensor, the movement amount (vx, vy, vz) can be determined without using the integration method. In this case, the movement amounts vx and vy in the x direction and the y direction can be determined by performing movement detection using images picked up by the single-eye camera, and the movement amount vz in the z direction can be determined from sensor data of the millimeter wave radar 22 or the like. As described above, where the movement amount (vx, vy, vz) is determined without using the integration method, since the movement vz in the z direction is not determined from images of the single-eye camera and the movement amounts vx and vy in the x direction and the y direction are not determined from sensor data of the millimeter wave radar 22 or the like, the calculation amount can be reduced in comparison with an alternative case in which the integration method is used.

Further, for example, it is possible to determine the movement amounts vx and vy by the integration method in which a single-eye camera and a different sensor are used and determine the movement amount vz by the integration method in which the millimeter wave radar 22 and a different sensor are used.

Figure 17:
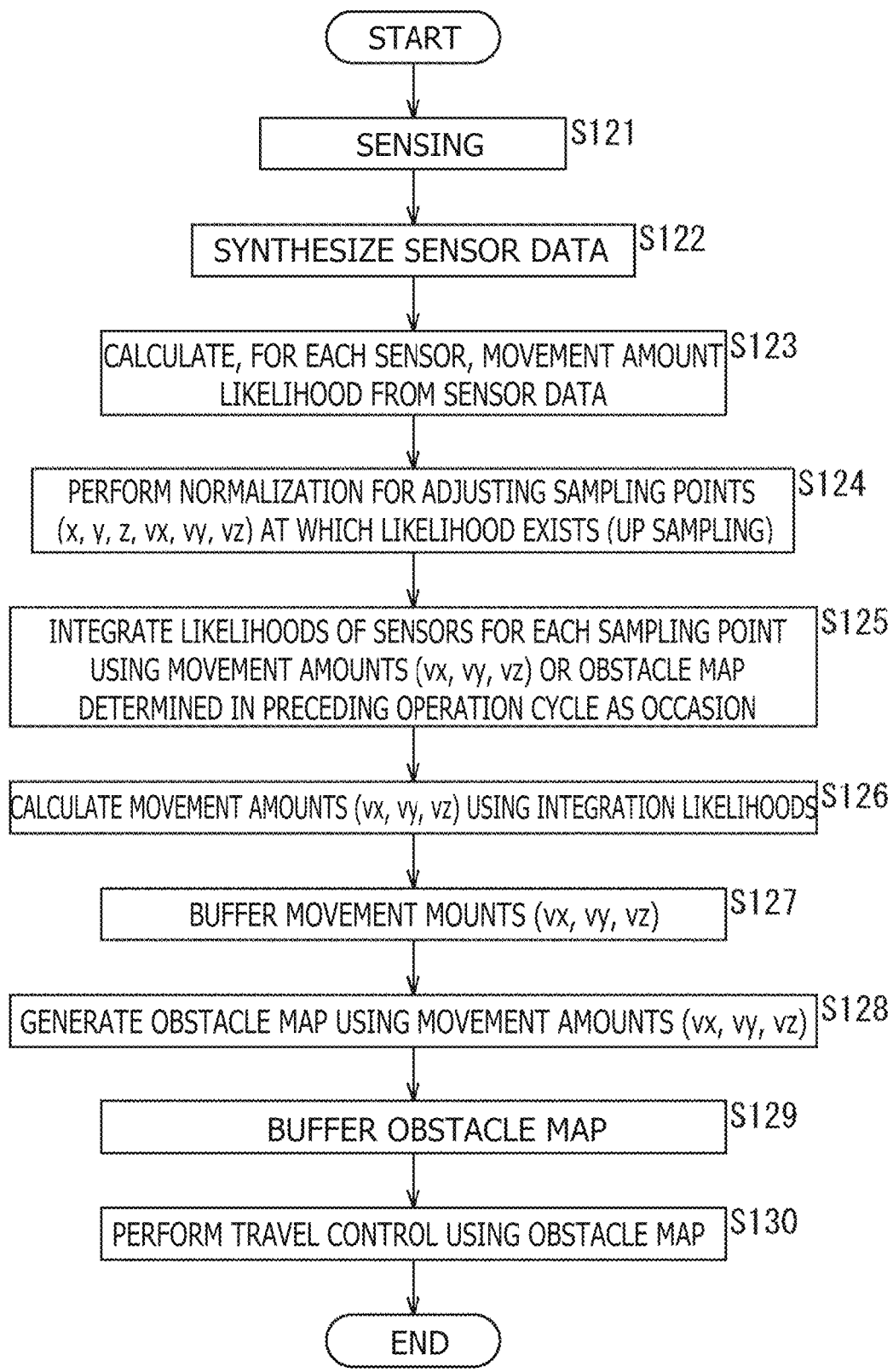
FIG. 17 is a flow chart illustrating an example of processing of the travel controlling apparatus.

FIG. 17 is a flow chart illustrating an example of processing of the travel controlling apparatus of FIG. 16.

At step S121, the stereo camera 21 picks up images from different points of view and outputs image data obtained as a result of the image pickup as sensor data to the transmission unit 23 similarly as at step S21 of FIG. 7.

Further, at step S121, the millimeter wave radar 22 sends a millimeter wave, receives the millimeter wave reflected by and returning from an object and outputs the received millimeter wave as sensor data to the transmission unit 23 similarly as at Step S21 of FIG. 7.

The transmission unit 23 transmits the sensor data outputted from the stereo camera 21 and the millimeter wave radar 22 to the synchronization unit 24, and the processing advances from step S121 to step S122.

At step S122, the synchronization unit 24 synchronizes the sensor data of the stereo camera 21 and the millimeter wave radar 22 from the transmission unit 23 with each other and outputs the synchronized sensor data to the likelihood calculation unit 61 similarly as at step S22 of FIG. 7, and the processing advances to step S123.

At step S123, the likelihood calculation unit 61 calculates, for each sampling point (x, y, z, vx, vy, vz), a movement amount likelihood according to the stereo camera 21 from sensor data of the stereo camera 21 from the synchronization unit 24, and supplies the movement amount likelihood to the normalization unit 62.

Further, the likelihood calculation unit 61 calculates, for each sampling point (x, y, z, vx, vy, vz), a movement amount likelihood according to the millimeter wave radar 22 from sensor data of the millimeter wave radar 22 from the synchronization unit 24, and supplies the movement amount likelihood to the normalization unit 62.

Then, the processing advances from step S123 to step S124, at which the normalization unit 62 performs normalization for making the sampling points (x, y, z, vx, vy, vz) from the likelihood calculation unit 61, coincide between the movement amount likelihoods of the sampling points (x, y, z, vx, vy, vz) according to the stereo camera 21 and the movement amount likelihoods of the sampling points (x, y, z, vx, vy, vz) according to the millimeter wave radar 22.

The normalization unit 62 supplies the movement amount likelihoods of the sampling points (x, y, z, vx, vy, vz) according to the stereo camera 21 and the movement amount likelihoods of the sampling points (x, y, z, vx, vy, vz) according to the millimeter wave radar 22 after the normalization to the integration unit 63. Then, the processing advances from step S124 to step S125.

At step S125, the integration unit 63 integrates, for each sampling point (x, y, z, vx, vy, vz), the movement amount likelihoods according to the stereo camera 21 and the movement amount likelihoods according to the millimeter wave radar 22 from the normalization unit 62.

Then, the integration unit 63 supplies the integration amounts of movement amounts for the sampling points (x, y, z, vx, vy, vz) obtained as a result of the integration to the movement amount calculation unit 64, and the processing advances from step S125 to step S126.

It is to be noted that, as described in FIG. 16, the integration unit 63 can perform integration of movement amount likelihoods according to the stereo camera 21 and movement amount likelihoods according to the millimeter wave radar 22 using the movement amounts (vx, vy, vz) and the obstacle map determined in the preceding operation cycle and stored in the buffer 31 as occasion demands. Consequently, the load of the integration processing can be reduced.

Further, the integration unit 63 can perform optimization of the integration likelihoods for the integration likelihoods of the movement amounts obtained as a result of the integration similarly to the integration unit 27 of FIG. 5.

At step S126, the movement amount calculation unit 64 determines, using the integration likelihoods of the movement amounts of the individual sampling points (x, y, z vx, vy, vz) from the integration unit 63, a movement amount (vx, vy, vz) (and a distance z) whose integration likelihood is highest as a movement amount of the position (x, y, z) or the obstacle at the position (x, y).

The, the movement amount calculation unit 64 supplies the movement amount (vx, vy, vz) to the obstacle map generation unit 65 and the buffer 31, and the processing advances from step S126 to step S127.

At step S127, the buffer 31 buffers (temporarily stores) the movement amount (vx, vy, vz) supplied from the movement amount calculation unit 64, and the processing advances to step S128.

Here, the movement amount (vx, vy, vz) supplied to the buffer 31 is used as occasion demands when the integration unit 63 performs next integration.

At step S128, the obstacle map generation unit 65 generates an obstacle map as obstacle information regarding an obstacle existing in front of the automobile using the movement amount (vx, vy, vz) from the movement amount calculation unit 64. Then, the obstacle map generation unit 65 supplies the obstacle map to the travel controlling unit 30 and the buffer 31, and the processing advances from step S128 to step S129.

At step S129, the buffer 31 buffers the obstacle map supplied from the obstacle map generation unit 65, and the processing advances to step S130.

Here, the obstacle map stored in the buffer 31 is used as occasion demands when the integration unit 63 performs next integration.

At step S130, the travel controlling unit 30 performs travel control of the automobile using the obstacle map from the obstacle map generation unit 65, and the processing is ended.

It is to be noted that the processes according to the flow chart of FIG. 17 are performed repetitively in pipeline.

Figure 18:
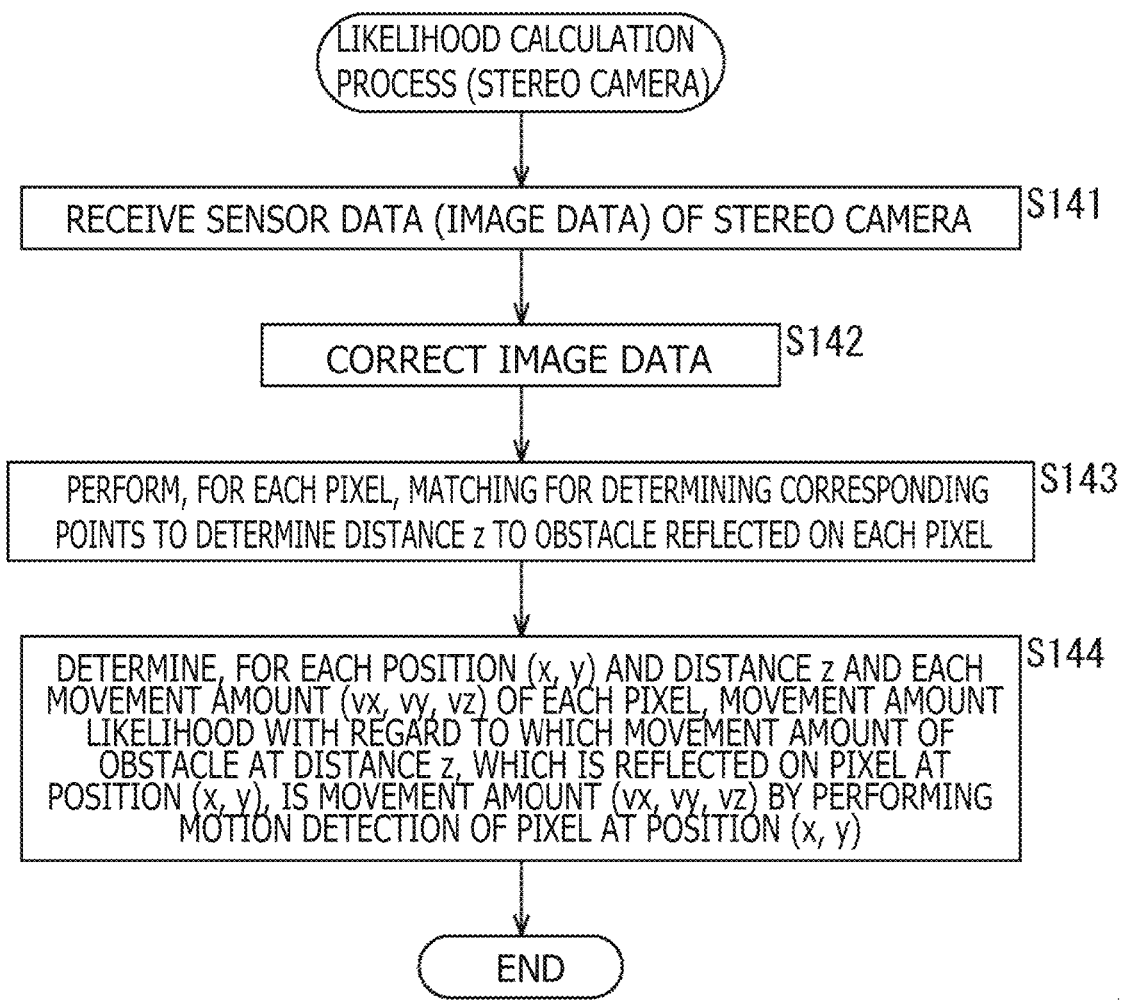
FIG. 18 is a flow chart illustrating an example of processing for determining a movement amount likelihood according to a stereo camera 21 from sensor data of the stereo camera 21.

FIG. 18 is a flow chart illustrating an example of processing for determining a movement amount likelihood according to the stereo camera 21 from sensor data of the stereo camera 21 at step S123 of FIG. 17.

At steps S141 and S142, processes similar to those at steps S41 and S42 of FIG. 8 are performed.

At step S143, similarly as at step S43 of FIG. 8, the likelihood calculation unit 61 determines one and the other of two images of different points of view picked up by the camera 21L and the camera 21R, which are sensor data of the stereo camera 21, as a standard image and a reference image, and performs, for each pixel of the standard image, matching for determining a corresponding point that is a pixel of the reference image corresponding to the pixel, for example, by block matching or the like.

Further, the likelihood calculation unit 61 determines the distance to an object reflected on each pixel of the standard image from the parallax between the pixel of the standard image and a corresponding point of the reference image obtained with respect to the pixel as the distance z of the position (x, y) of the pixel of the standard image, and the processing advances from step S143 to step S144.

At step S144, the likelihood calculation unit 61 determines, for each position (x, y) and distance z and each movement amount (vx, vy, vz) of each pixel of the standard image as sensor data of the stereo camera 21, a movement amount likelihood with regard to which the movement amount of the object at the position (x, y) and the distance z is the movement amount (vx, vy, vz), for example, by performing movement detection of the pixel at the position (x, y) of the standard image, and the processing is ended.

In particular, the likelihood calculation unit 61 selects, for example, the latest frame of the standard image as a noticed frame and successively selects the pixels of the noticed frame as a noticed pixel. Further, the likelihood calculation unit 61 performs block matching between blocks of a preceding frame preceding by one frame to the noticed frame and centered at positions displaced by a plurality of movement amounts (vx, vy) in the x direction and the y direction from the noticed pixel and a block of the noticed frame centered at the noticed pixel.

Consequently, a matching error of block matching is determined for each of the plurality of movement amounts (vx, vy) with respect to the noticed pixel.

Further, the likelihood calculation unit 61 determines the movement amount vz in the z direction from the distance determined already using the preceding frame as the noticed frame with respect to the pixel of the preceding frame at each of the positions displaced individually by the movement amounts (vx, vy) from the noticed pixel and the distance z determined at immediately preceding step S143 with respect to the noticed pixel.

From the foregoing, for each position (x, y) and distance z of each pixel of the noticed pixel, a matching error when the movement amount of an object at the position (x, y) and the distance z is the movement amount (vx, vy, vz) is determined.

Then, for each position (x, y) and distance z of each pixel of the noticed pixel, the likelihood calculation unit 61 determines a movement amount likelihood in regard to which the movement amount of the object at the position (x, y) and the distance z is the movement amount (vx, vy, vz) using the matching error In particular, if the matching error in regard to the position (x, y) and distance z and the movement amount (vx, vy, vz) is represented as cost(x, y, z, vx, vy, vz), then the likelihood calculation unit 61 determines the movement amount likelihood $P_{ST}$(x, y, z, vx, vy, vz) in regard to which the movement amount of the object at the position (x, y) and the distance z is the movement amount (vx, vy, vz), for example, in accordance with an expression $P_{ST}$(x, y, z, vx, vy, vz)=exp (−cost(x, y, z, vx, vy, vz).

Figure 19:
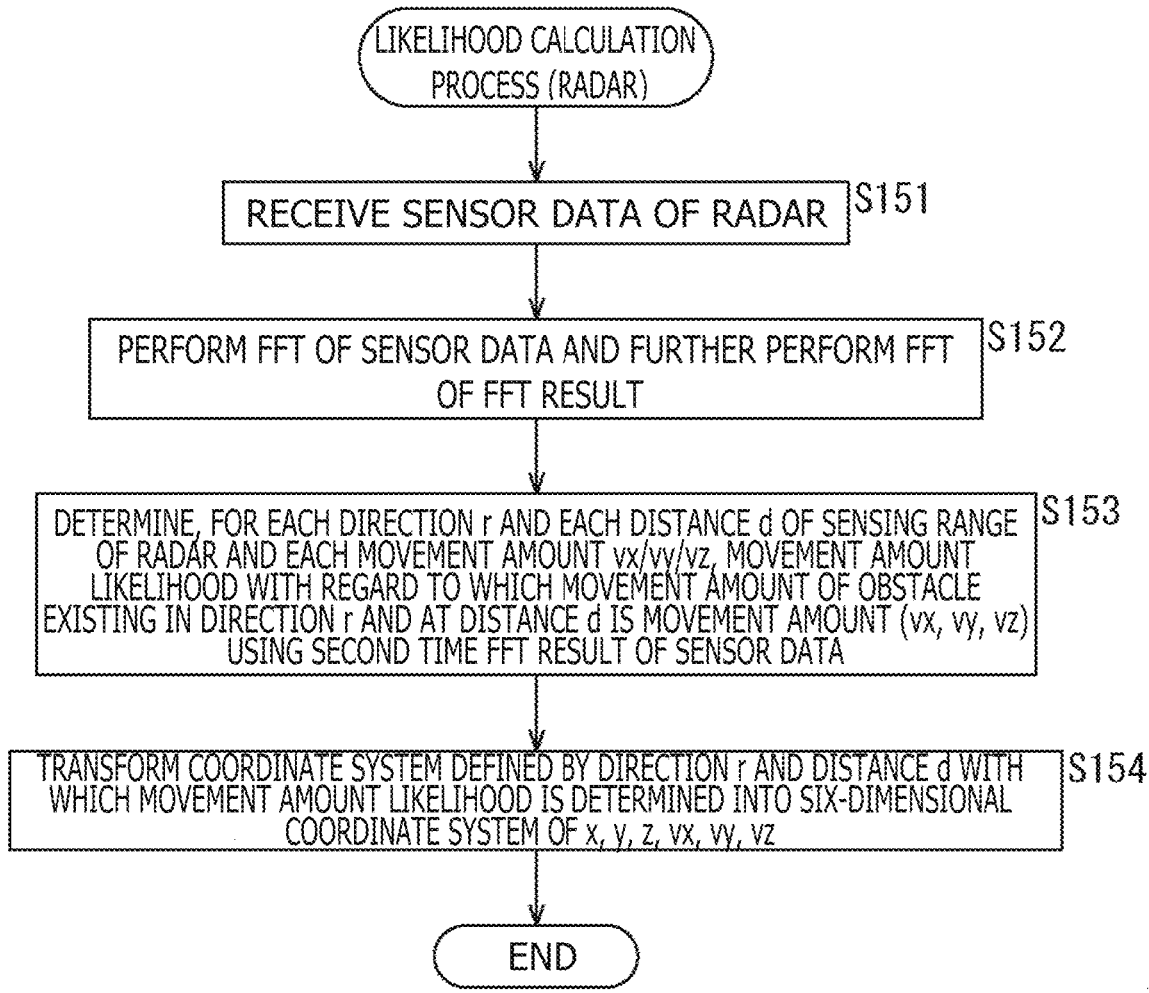
FIG. 19 is a flow chart illustrating an example of processing for determining a movement amount likelihood according to a millimeter wave radar 22 from sensor data of the millimeter wave radar 22.

FIG. 19 is a flow chart illustrating an example of processing for determining a movement amount likelihood according to the millimeter wave radar 22 from sensor data of the millimeter wave radar 22 at step S123 of FIG. 17.

At step S151, the likelihood calculation unit 61 receives (captures) sensor data of the millimeter wave radar 22 from the synchronization unit 24, and the processing advances to step S152.

At step S152, the likelihood calculation unit 61 performs FFT of the sensor data of the millimeter wave radar 22 and further performs FFT of a result of the FFT, and the processing advances to step S153.

Here, in the present embodiment, it is assumed that, in the sensor data of the millimeter wave radar 22, the FFT result of the FFT result, namely, the strength of the FFT result for the second time, represents a likelihood that an object is moving by a movement amount corresponding to the point of time of the strength.

It is to be noted that, for the FFT result of the sensor data of the millimeter wave radar 22, correction similar to that in the case at step S53 of FIG. 9 can be performed.

At step S153, the likelihood calculation unit 61 determines, from the FFT result for the second time of the sensor data of the millimeter wave radar 22, the movement amount likelihood of each movement amount (vx, vy, vz) when it is assumed that, in regard to each direction (orientation) r and each distance d in a sensing range of the millimeter wave radar 22 and each movement amount (vx, vy, vz), the movement amount of the object in the direction r and at the distance d is the movement amount (vx, vy, vz).

Here, if the FFT result for the second time of the sensor data of the millimeter wave radar 22 corresponding to the direction r, distance d and movement amount (vx, vy, vz) is represented as fft2(r, d, vx, vy, vz), then the movement amount likelihood $P_R$ in a case where the movement amount of the object existing in the direction r at the distance d is the movement amount (vx, vy, vz) can be determined, for example, in accordance with an expression $P_R$=fft2(r, d, vx, vy, vz)/$\Sigma_{(vx, vy, vz)}$fft2(r, d, vx, vy, vz).

$\Sigma_{(vx, vy, vz)}$fft2(r, d, vx, vy, vz) of the movement amount likelihood $P_R$=fft2(r, d, vx, vy, vz)/$\Sigma_{(vx, vy, vz)}$fft2(r, d, vx, vy, vz) represents summation of fft2(r, d, vx, vy, vz) when the movement amount (vx, vy, vz) is replaced by each movement amount for determining a movement amount likelihood.

Thereafter, the processing advances from step S154 to step S155, at which the likelihood calculation unit 61 transforms the direction r and distance d with which a movement amount likelihood according to the millimeter wave radar 22 is obtained and the movement amount (vx, vy, vz) into each position (x, y, z, vx, vy, vz) that is each position (x, y, z) of a six-dimensional coordinate system by coordinate transformation to determine a movement amount likelihood of each sampling point (x, y, z, vx, vy, vz) that is each position (x, y, z) of the six-dimensional coordinate system. Then, the processing is ended.

It is to be noted that, while, in FIG. 16, the millimeter wave radar 22 is provided in addition to the stereo camera 21 as an image sensor, as a sensor other than the stereo camera 21 as the image sensor, for example, a ToF sensor 51 can be used in place of the millimeter wave radar 22 as depicted in FIG. 12.

Further, as a sensor other than the stereo camera 21 as the image sensor, for example, a millimeter wave radar 22 and a ToF sensor 51 can be used as depicted in FIG. 15.

Figure 20:
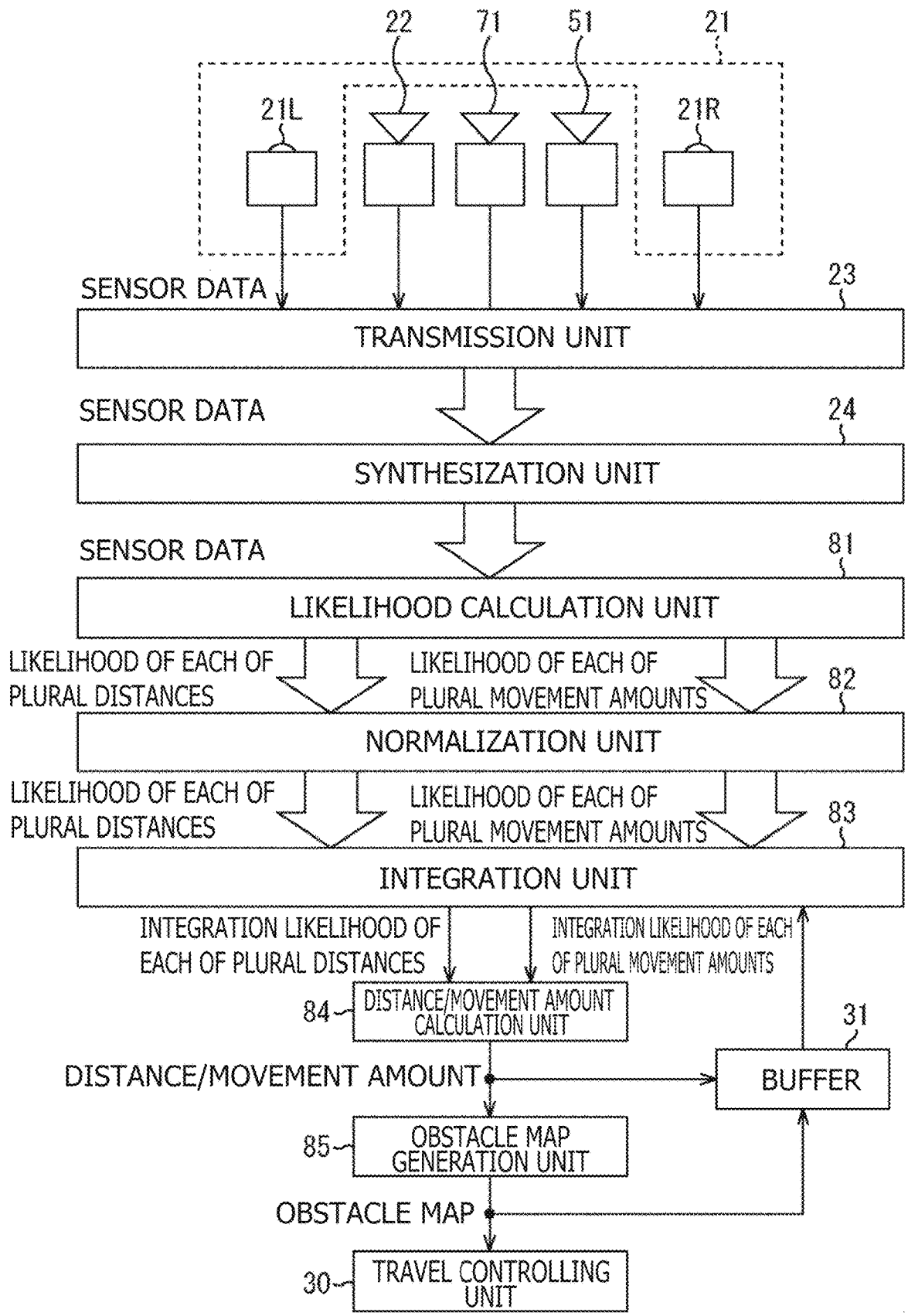
FIG. 20 is a block diagram depicting a fifth detailed configuration example of the travel controlling apparatus to which the present technology is applied.

Fifth Detailed Configuration Example of Travel Controlling Apparatus to which Present Technology is Applied FIG. 20 is a block diagram depicting a fifth detailed configuration example of the travel controlling apparatus to which the present technology is applied.

It is to be noted that, in FIG. 20, corresponding portions to those in FIG. 5 are denoted by like reference characters, and description of them is omitted suitably in the following description.

In FIG. 20, the travel controlling apparatus includes a stereo camera 21, a millimeter wave radar 22, a transmission unit 23, a synchronization unit 24, a travel controlling unit 30, a buffer 31, a ToF sensor 51, a LIDAR 71, a likelihood calculation unit 81, a normalization unit 82, an integration unit 83, a distance/movement amount calculation unit 84 and an obstacle map generation unit 85.

Accordingly, the travel controlling apparatus of FIG. 20 is common to that of FIG. 5 in that it includes the stereo camera 21, millimeter wave radar 22, transmission unit 23, synchronization unit 24, travel controlling unit 30 and buffer 31.

However, the travel controlling apparatus of FIG. 20 is different from that of FIG. 5 in that it includes the likelihood calculation unit 81, normalization unit 82, integration unit 83, distance/movement amount calculation unit 84 and obstacle map generation unit 85 in place of the likelihood calculation unit 25, normalization unit 26, integration unit 27, distance calculation unit 28 and obstacle map generation unit 29.

Further, the travel controlling apparatus of FIG. 20 is different from that of FIG. 5 in that it newly includes the ToF sensor 51 of FIG. 12 and the LIDAR 71.

The likelihood calculation unit 81 has functions similar to those of the likelihood calculation unit 25 of FIG. 5 and the likelihood calculation unit 61 of FIG. 16. The normalization unit 82 has functions similar to those of the normalization unit 26 of FIG. 5 and the normalization unit 62 of FIG. 16. The integration unit 83 has functions similar to those of the integration unit 27 of FIG. 5 and the integration unit 63 of FIG. 16. The distance/movement amount calculation unit 84 has functions similar to those of the distance calculation unit 28 of FIG. 5 and the movement amount calculation unit 64 of FIG. 16.

In the travel controlling apparatus of FIG. 20, processing similar to that of the travel controlling apparatus of FIGS. 5 and 16 is performed for sensor data of the stereo camera 21, millimeter wave radar 22, ToF sensor 51 and LIDAR 71, and the distance/movement amount calculation unit 84 determines distances and movement amounts thereby.

Then, the obstacle map generation unit 85 generates an obstacle map using the distances and the movement amounts determined by the distance/movement amount calculation unit 84.

It is to be noted that, while, in the travel controlling apparatus of FIG. 5, the distance z whose integration likelihood is highest is determined, for each position (x, y), as a distance to an object reflected on a pixel at the position (x, y) using integration likelihoods of distances for the individual sampling points (x, y, z) determined by the integration unit 27, from the integration likelihoods of distances, information other than the distance to the object can be determined.

In particular, for example, it is possible to detect, for each (x, z, y) whose integration likelihood (integration likelihood volume in FIG. 10) is highest among integration likelihoods of distances for each sampling point (x, y, z) and determine a region configured from points (x, y, z) at which the calculated y values are a substantially fixed value as a region of the road surface.

Similarly, also from integration likelihoods of movement amounts for each sampling point (x, y, z, vx, vy, vz), information other than the movement amount can be determined using the integration likelihoods of movement amounts.

<Description of Computer to which Present Technology is Applied>

Now, while a series of processes performed by each block such as, for example, the likelihood calculation unit 12, normalization unit 13 or integration unit 14 of FIG. 1 can be executed by hardware, it may otherwise be executed by software. Where the series of processes is executed by software, a program which constructs the software is installed into a computer for exclusive use or the like.

Thus, FIG. 21 depicts a configuration example of an embodiment of a computer into which the program for executing the series of processes described above is installed.

The program can be recorded in advance in a hard disk 105 or a ROM 103 as a recording medium built in the computer.

Alternatively, the program can be stored (recorded) in a removable recording medium 111. Such a removable recording medium 111 as just described can be provided as so-called package software. Here, as the removable recording medium 111, for example, a flexible disk, a CD-ROM (Compact Disc Read Only Memory), an MO (Magneto Optical) disk, a DVD (Digital Versatile Disc), a magnetic disk, a semiconductor memory and so forth are available.

It is to be noted that, in addition to installation of the program into the computer from such a removable recording medium 111 as described hereinabove, the program can be downloaded into the computer through a communication network or a broadcasting network and installed into the hard disk 105 built in the computer. In particular, the program can be transferred, for example, from a download site to the computer by wireless communication through an artificial satellite for digital satellite broadcasting or can be transferred by wired communication to the computer through a network such as a LAN (Local Area Network) or the Internet.

The computer has a CPU (Central Processing Unit) 102 built therein, and an input/output interface 110 is connected to the CPU 102 through a bus 101.

If an inputting unit 107 is operated or the like by a user to input an instruction through the input/output interface 110, then the CPU 102 executes the program stored in the ROM (Read Only Memory) 103 in accordance with the instruction. Also, the CPU 102 loads a program stored in the hard disk 105 into a RAM (Random Access Memory) 104 and executes the program.

Consequently, the CPU 102 performs processing in accordance with the flow charts described hereinabove or processing that is performed by the components of the block diagrams described hereinabove. Then, the CPU 102 causes a result of the processing to be outputted from an outputting unit 106, for example, through the input/output interface 110, to be transmitted from a communication unit 108, to be recorded into the hard disk 105 or the like through the input/output interface 110 as occasion demands.

It is to be noted that the inputting unit 107 is configured from a keyboard, a mouse, a microphone and so forth. Meanwhile, the outputting unit 106 is configured from an LCD (Liquid Crystal Display), a speaker and so forth.

Here, in the present specification, processes the computer performs in accordance with the program may not necessarily be performed in a time series in accordance with the order described in the flow charts. In other words, the processes performed in accordance with the program by the computer include also processes executed in parallel or separately (for example, parallel processing or processing by an object).

Further, the program may be processed by a single computer (processor) or may be processed in a distributed manner by a plurality of computers. Further, the program may be transferred to and executed by a remote computer.

Further, in the present specification, the term system is used to signify an aggregation composed of a plurality of constituent elements (devices, modules (parts) and so forth) and it does not matter whether or not all of the constituent elements are accommodated in the same housing. Accordingly, a plurality of apparatus accommodated in separate housings and connected to each other through a network configure a system, and also one apparatus that includes a plurality of modules accommodated in a single housing configures a system.

It is to be noted that the embodiment of the present technology is not limited to the embodiment described above and can be altered in various manners without departing from the subject matter of the present technology.

For example, the present technology can assume a configuration of a crowd computer in which one function is shared and cooperatively processed by a plurality of apparatus through a network.

Further, the steps described with reference to the flow charts described hereinabove not only can be executed by one apparatus but also can be shared and executed by a plurality of apparatus.

Furthermore, where a plurality of processes are included in one step, the plurality of processes included in the one step may be executed by a single apparatus or may be shared and executed by a plurality of apparatus.

Further, the effects described herein are exemplary to the end and are not restrictive, and other effects may be involved.

It is to be noted that the present technology can take the following configuration.

<1>

An information processing apparatus, including:

a likelihood calculation unit configured to calculate, from information obtained by each of movement detection methods including a movement detection method for detecting a movement amount of an object using an image and one or more different movement detection methods, movement amount likelihoods with regard to which the movement amount of an object is each of a plurality of movement amounts; and an integration unit configured to integrate the movement amount likelihoods according to the plurality of movement detection methods to determine integration likelihoods individually of the plurality of movement amounts.

<2>

The information processing apparatus according to <1>, further including:

a movement amount calculation unit configured to determine the movement amount of the object using the integration likelihoods.

<3>

The information processing apparatus according to <2>, further including:

a generation unit configured to generate obstacle information regarding an obstacle using the movement amount of the object.

<4>

The information processing apparatus according to <3>, in which the integration unit integrates the movement amount likelihoods according to the plurality of movement detection methods using the movement amounts or the obstacle information obtained in a preceding operation cycle.

<5>

The information processing apparatus according to any one of <1> to <4>, further including:

a synchronization unit configured to synchronize sensor data outputted from a camera that is a sensor for picking up the image and the one or more sensors used for detection of movement amounts by one or more movement detection methods.

<6>

The information processing apparatus according to any one of <1> to <5>, in which a sensor used for detection of a movement amount by the one or more movement detection methods is one or more sensors from among a radar, a ToF sensor and a LIDAR.

<7>

An information processing method, including:

calculating, from information obtained by each of movement detection methods including a movement detection method for detecting a movement amount of an object using an image and one or more different movement detection methods, movement amount likelihoods with regard to which the movement amount of an object is each of a plurality of movement amounts; and integrating the movement amount likelihoods according to the plurality of movement detection methods to determine integration likelihoods individually of the plurality of movement amounts.

<8>

A program for causing a computer to function as:

a likelihood calculation unit configured to calculate, from information obtained by each of movement detection methods including a movement detection method for detecting a movement amount of an object using an image and one or more different movement detection methods, movement amount likelihoods with regard to which the movement amount of an object is each of a plurality of movement amounts; and an integration unit configured to integrate the movement amount likelihoods according to the plurality of movement detection methods to determine integration likelihoods individually of the plurality of movement amounts.

REFERENCE SIGNS LIST $11_1$ to $11_N$ Sensor, 12 Likelihood calculation unit, 13 Normalization unit, 14 Integration unit, 15 Distance/measurement amount calculation unit, 16 Travel controlling unit, 21 Stereo camera, 21L, 21R Camera, 22 Millimeter wave radar, 23 Transmission unit, 24 Synchronization unit, 25 Likelihood calculation unit, 26 Normalization unit, 27 Integration unit, 28 Distance calculation unit, 29 Obstacle map generation unit, 30 Travel controlling unit, 31 Buffer, 51 ToF sensor, 61 Likelihood calculation unit, 62 Normalization unit, 63 Integration unit, 64 Movement amount calculation unit, 71 LIDAR, 81 Likelihood calculation unit, 82 Normalization unit, 83 Integration unit, 84 Distance/movement amount calculation unit, 85 Obstacle map generation unit, 101 Bus, 102 CPU, 103 ROM, 104 RAM, 105 Hard disk, 106 Outputting unit, 107 Inputting unit, 108 Communication unit, 109 Drive, 110 Input/output interface, 111 Removable recording medium

The invention claimed is:

1. An information processing apparatus, comprising:
processing circuitry configured to:
calculate, based on sensor data received from a first sensor of a first type, the first sensor configured to capture an image, and sensor data received from a second sensor of a second type different from the first type, movement amount likelihoods of each of a plurality of movement amounts of an object, wherein the movement amount likelihoods are calculated for each of the first sensor and the second sensor;
integrate the calculated movement amount likelihoods to determine integration likelihoods individually of the plurality of movement amounts;
determine a movement amount of the object based on the determined integration likelihoods;
generate an obstacle map as obstacle information regarding an obstacle using the movement amount of the object; and
perform travel control of a vehicle using the obstacle map, wherein the determined movement amount of the object is based on the sensor data from the first sensor and the sensor data from the second sensor and wherein the movement amount likelihoods are integrated based at least in part on the obstacle map and the movement amount determined in a preceding operation cycle and are integrated only for sampling points located within a predetermined range between a position of the object, determined in the preceding operation cycle, and the sampling points.

2. The information processing apparatus according to claim 1,
wherein the processing circuitry is further configured to synchronize sensor data outputted from a camera that is the first sensor for picking up the image and the second sensor used for detection of movement amounts.

3. The information processing apparatus according to claim 1, wherein
the second sensor is one or more sensors from among a radar, a ToF (Time of Flight) sensor and a LIDAR (light detection and ranging).

4. An information processing method performed by processing circuitry, the method comprising:
calculating, based on sensor data received from a first sensor of a first type, the first sensor configured to capture an image, and sensor data received from a second sensor of a second type different from the first type, movement amount likelihoods of each of a plurality of movement amounts of an object, wherein the movement amount likelihoods are calculated for each of the first sensor and the second sensor;
integrating the calculated movement amount likelihoods to determine integration likelihoods individually of the plurality of movement amounts;
determining a movement amount of the object based on the determined integration likelihoods;
generating an obstacle map as obstacle information regarding an obstacle using the movement amount of the object; and
performing travel control of a vehicle using the obstacle map, wherein the determined movement amount of the object is based on the sensor data from the first sensor and the sensor data from the second sensor and wherein the movement amount likelihoods are integrated based at least in part on the obstacle map and the movement amount determined in a preceding operation cycle and are integrated only for sampling points located within a predetermined range between a position of the object, determined in the preceding operation cycle, and the sampling points.

5. A non-transitory computer readable medium containing instructions that, when executed by processing circuitry, perform an information processing method comprising:

calculating, based on sensor data received from a first sensor of a first type, the first sensor configured to capture an image, and sensor data received from a second sensor of a second type different from the first type, movement amount likelihoods of each of a plurality of movement amounts of an object, wherein the movement amount likelihoods are calculated for each of the first sensor and the second sensor;

integrating the calculated movement amount likelihoods to determine integration likelihoods individually of the plurality of movement amounts;

determining a movement amount of the object based on the determined integration likelihoods;

generating an obstacle map as obstacle information regarding an obstacle using the movement amount of the object; and performing travel control of a vehicle using the obstacle map, wherein the determined movement amount of the object is based on the sensor data from the first sensor and the sensor data from the second sensor and wherein the movement amount likelihoods are integrated based at least in part on the generated obstacle map and the movement amount determined in a preceding operation cycle and are integrated only for sampling points located within a predetermined range between a position of the object, determined in the preceding operation cycle, and the sampling points.

* * * * *